United States Patent
Aluc et al.

(10) Patent No.: US 12,547,602 B2
(45) Date of Patent: Feb. 10, 2026

(54) LOG ENTRY REPRESENTATION OF DATABASE CATALOG

(71) Applicant: SAP SE, Walldorf (DE)

(72) Inventors: Gunes Aluc, Waterloo (CA); Iman Elghandour, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/436,521

(22) Filed: Feb. 8, 2024

(65) Prior Publication Data
US 2025/0258808 A1    Aug. 14, 2025

(51) Int. Cl.
G06F 16/00    (2019.01)
G06F 11/14    (2006.01)
G06F 16/21    (2019.01)
G06F 16/23    (2019.01)

(52) U.S. Cl.
CPC ...... *G06F 16/2322* (2019.01); *G06F 11/1402* (2013.01); *G06F 16/219* (2019.01); *G06F 16/2358* (2019.01)

(58) Field of Classification Search
CPC ............ G06F 16/2322; G06F 16/219; G06F 16/2358; G06F 11/1402

USPC ........................................ 707/609
See application file for complete search history.

(56) References Cited

U.S. PATENT DOCUMENTS

| | | | |
|---|---|---|---|
| 11,609,890 B1 * | 3/2023 | Vermeulen | G06F 16/283 |
| 2016/0371355 A1 * | 12/2016 | Massari | G06F 16/25 |
| 2017/0220617 A1 * | 8/2017 | Bortnikov | G06F 16/2329 |

OTHER PUBLICATIONS

Communication: "Extended European Search Report", Mar. 11, 2025 (Mar. 11, 2025), European Patent Office, for European Application No. 24209667.5-1203, 12 pages.

* cited by examiner

*Primary Examiner* — Raquel Perez-Arroyo
(74) *Attorney, Agent, or Firm* — Buckley, Maschoff & Talwalkar LLC

(57) ABSTRACT

A system includes reception of a first transaction including updates to a database catalog comprising transactions stored on a log and a timestamp of a snapshot of the database catalog, determination of a signature of a transaction stored on the log after the timestamp of the snapshot, determination, based on the signature, that a conflict exists between the updates to the database catalog and updates of the stored transaction, and, in response to the determination that a conflict exists, reject the first transaction.

20 Claims, 30 Drawing Sheets

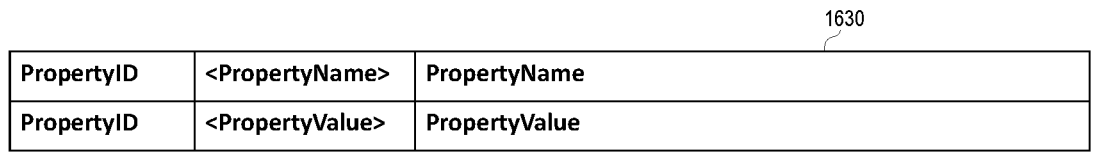
*FIG. 16*

| DBID | <is> | Database |
|---|---|---|
| DBID | <hasName> | DBName |
| DBID | <hasDescription> | DBDescription |
| DBID | <hasLocation> | DBLocation |
| DBID  R | <hasProperty> | DBPropertyID |

*FIG. 17*

| D12345 | <is> | Database |
|---|---|---|
| D12345 | <hasName> | 'employees' |
| D12345 | <hasDescription> | 'For software companies' |
| D12345 | <hasLocation> | 'file:/users/temp/employees.db' |
| D12345 | <hasProperty> | P1 |
| D12345 | <hasProperty> | P2 |

*FIG. 18*

| P1 | <is> | Property |
|---|---|---|
| P1 | <hasName> | 'ID' |
| P1 | <hasValue> | '001' |

| P2 | <is> | Property |
|---|---|---|
| P2 | <hasName> | 'Name' |
| P2 | <hasValue> | 'John' |

*FIG. 19*

| TID | | <is> | Table |
|---|---|---|---|
| TID | | <belongsToDB> | DBID |
| TID | | <hasName> | TName |
| TID | R | <hasColumn> | CID |
| TID | | <useDataSource> | CSV \| TXT \| ORC \| JDBC \| PARQUET |
| TID | R | <hasOption> | OptionID |
| TID | | <partitionedByCol> | CID |
| TID | | <clusteredSorting> | ClusteredSortingInfoID |
| TID | | <hasLocation> | TLocation |
| TID | | <hasComment> | String |
| TID | | <hasProperty> | TPropertyID |
| TID | | <asSelectStatement> | SelectStatement |

| CID | <is> | Column |
|---|---|---|
| CID | <has name> | CName |
| CID | <has type> | INT \| STRING \| DATE \| ... |
| CID | <has comment> | String |

| orderedCID | <is> | Column in Ordered Set |
|---|---|---|
| orderedCID | <columnID> | CID |
| order | <hasOrder> | Number |

| sortingOrderedCID | <is> | Column in Ordered Set for Sorting |
|---|---|---|
| sortingOrderedCID | <columnID> | CID |
| sortingOrderedCID | <hasOrder> | Number |
| sortingOrderedCID | <hasSortingOrder> | ASC \| DESC |

*FIG. 23*

| T12345 | <is> | Table |
|---|---|---|
| T12345 | <belongsToDB> | D12346 |
| T12345 | <hasName> | 'student_partition_bucket' |
| T12345 | <hasColumn> | C1234567 |
| T12345 | <hasColumn> | C1234568 |
| T12345 | <hasColumn> | C1234569 |
| T12345 | <useDataSource> | PARQUET |
| T12345 | <partitionedBy> | C1234569 |
| T12345 | <clusteredSorting> | CS12345 |
| T12345 | <asSelectStatement> | 'SELECT * FROM student' |
| C1234567 | <is> | Column |
| C1234567 | <hasName> | 'id' |
| C1234567 | <hasType> | 'INT' |
| C1234568 | <is> | Column |
| C1234568 | <hasName> | 'name' |
| C1234568 | <hasType> | 'STRING' |
| C1234569 | <is> | Column |
| C1234569 | <hasName> | 'age' |
| C1234569 | <hasType> | 'INT' |

FIG. 24

| TID | <hasName> | TNameOld |

| TID | <hasName> | TNameNew |

| C1234570 | <is> | Column |
| C1234570 | <hasName> | 'StudentAge' |
| C1234570 | <hasType> | 'INT' |
| C1234569 | <hasName> | 'age' |
| C1234569 | <hasType> | 'INT' |
| C1234569 | <is> | Column |
| T12345 | <has column> | C1234569 |
| T12345 | <has column> | C1234570 |

LOG ENTRY REPRESENTATION OF DATABASE CATALOG

BACKGROUND

A database system typically stores large amounts of data in the form of database tables. Cloud-based object stores are increasingly popular as shared storage for database systems which are implemented as a database-as-a-service. Cloud-based object stores offer valuable properties such as elastic scale-out, high availability and fault-tolerance, in addition to enabling database systems to separate the scalability of compute resources from that of storage resources. Users also benefit from a pay-as-you-go pricing model and a user experience which may be preferable to local or on-premise deployments.

Open Table Formats (OTFs) such as Delta Lake and Iceberg allow developers to define tables over columnar files stored in an object store (e.g., Parquet files) and perform CRUD (Create, Read, Update, Delete) operations on those tables. By clearly separating the table metadata from the table data and versioning the table metadata, OTFs enable multiple tenants to concurrently read and make modifications to the same table in an efficient manner. OTF drivers are responsible for managing table-level metadata stored in the columnar files of the object store, but often rely on other representations and storage formats to manage their database catalogs (i.e., metadata defining the schema of a database as a whole).

In particular, a database system using an OTF may represent its database catalog as a relational database which is managed by a separate relational database management system. This catalog implementation does not scale well in environments including thousands of tables and/or thousands of clients querying the catalog, such as in a multi-tenancy environment. As a result, the relational database management system that manages the catalog becomes a performance bottleneck, thereby compromising the very concurrency benefits for which the OTF has been selected for use.

Systems are desired to efficiently support a high degree of concurrency in a multitenant OTF environment in which the database catalog may be frequently read and updated.

BRIEF DESCRIPTION OF THE DRAWINGS

FIGS. 16-23 illustrate representation of database artifacts using RDF triples according to some embodiments.

FIGS. 24-26 illustrate operations on OTF database tables using RDF triples according to some embodiments.

DETAILED DESCRIPTION

The following description is provided to enable any person in the art to make and use the described embodiments and sets forth the best mode contemplated for carrying out some embodiments. Various modifications, however, will be readily apparent to those in the art.

Briefly, embodiments represent a database catalog as a set of log entries, where each entry, or transaction, describes one or more incremental updates to a snapshot of the catalog. A transaction may delete any number of existing facts from the snapshot and/or insert any number of facts into the snapshot. Storing the catalog using a log-based data structure may advantageously enable fast, append-only updates and fast scans in some embodiments.

As will be described in detail below, a transaction is committed to the log only if no updates which conflict with the updates of the transaction have been committed to the log since the generation of the snapshot on which the transaction is based. This protocol enables multiple tenants to, concurrently and independently, request and receive snapshots of the catalog, compute updates to their received snapshots, and then commit those updates to the log, even if the updates of different tenants are computed based on different catalog snapshots. If a conflict is identified between a transaction and updates committed to the log since the generation of the snapshot on which the transaction is based, the tenant may be permitted to retry computing its updates in view of a fresher snapshot, up to a user-configurable maximum number of retries.

By delegating computationally-expensive operations to the tenants, embodiments may minimize the duration over which the log needs to be locked and support concurrent catalog updates at much larger scales than were previously achievable. Embodiments may thereby particularly benefit multi-tenant environments in which an OTF catalog is frequently read and updated, but are not limited thereto.

Signatures may be used in some embodiments to facilitate fast identification of conflicts. For example, a signature is computed over the log updates of a committed transaction and is stored in the log entry for the transaction. A signature computed for the log updates of a candidate transaction is evaluated against the signatures to determine whether any of the updates of the candidate transaction conflict with the updates of the committed transactions.

According to some embodiments, the database catalog is represented using the Resource Description Framework (RDF). For example, each fact of the database catalog may be represented as an RDF triple and catalog operations may be mapped to a set of deletions and/or a set of insertions of RDF triples. The log may be periodically checkpointed to truncate redundant facts (i.e., RDF triples) that have been added to the log by a transaction but later deleted by a subsequent transaction.

Figure 1:
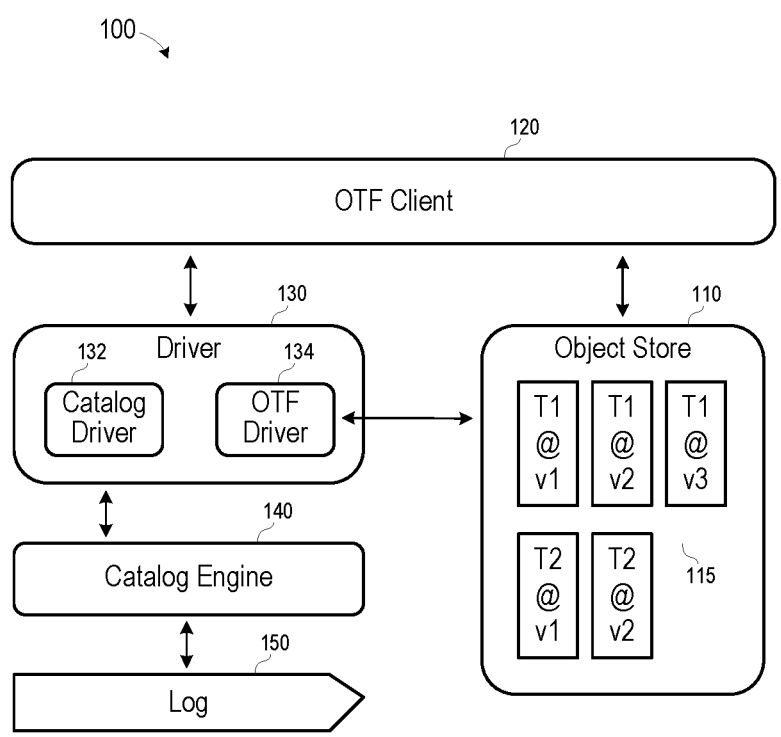
FIG. 1 is a block diagram of an OTF database architecture using a log-structured database catalog according to some embodiments.

FIG. 1 is a block diagram of OTF database architecture 100 providing a log-structured database catalog according to some embodiments. Each illustrated element of architecture 100 may be implemented using any suitable combination of computing hardware and/or software that is or becomes known. Architecture 100 may comprise components of a standalone or distributed (i.e., multi-node) database system. In some embodiments, two or more elements of architecture 100 are implemented by a single computing device. One or more elements of architecture 100 may be implemented as a cloud service (e.g., Software-as-a-Service, Platform-as-a-Service) which may elastically allocate and de-allocate compute resources (e.g., virtual machines) and storage resources (e.g., file-based, block-based, object-based) depending on demand, cost and/or other factors.

Architecture 100 includes object store 110 storing files 115 in an object format as is known in the art. Object store 110 may comprise a cloud resource implemented by servers within a cloud datacenter of a cloud resource provider as is known in the art. According to some embodiments, files 115 conform to a columnar file format such as but not limited to Parquet.

OTF client 120 may comprise a server application executed on a cloud platform which provides services thereto. End-users may thereby access OTF client 120 via a Web-based user portal to the cloud platform. OTF client 120 may serve many users of one or more tenants, each of which may concurrently read and request updates to a database catalog as described below.

OTF client 120 may upload files 115 to object store 110. Each of files 115 stores data of table columns and metadata used to manage table versioning, formatted according to an OTF. OTF client 120 defines tables over files 115 using OTF driver 134 of driver 130. OTF driver 134 is responsible for executing necessary CRUD operations on the data and metadata of files 115.

Catalog driver 132 communicates with catalog engine 140 to update the schema of the tables defined over files 115, i.e., the database catalog. Log 150 stores the database catalog as a set of successive committed transactions, where each transaction may consist of one or more deletions from and/or one or more insertions to the facts in an existing snapshot of the database catalog. Deletions and insertions are collectively referred to as updates, and each update is associated with a particular fact of the database catalog. Accordingly, catalog engine 140 may determine a set of facts (i.e., a snapshot of the database catalog) in effect at a given time by executing all of the updates of the successive transactions which were committed to log 150 up to the given time.

To update the database catalog, OTF client 120 transmits requested changes (e.g., add/drop/rename a table/column) to catalog driver 132 of driver 130. The changes may be requested in the form of Data Description Language (DDL) and/or Data Manipulation Language (DML) commands. In response, catalog driver 132 requests a snapshot of the database catalog from catalog engine 140. Catalog engine 140 calculates and returns a snapshot of the catalog metadata together with a timestamp (e.g., the value of the transaction clock at the given time) represented by the snapshot. Based on the snapshot, catalog driver 132 maps the requested changes to the catalog metadata into a set of facts to be deleted from the snapshot and a set of facts to be inserted into the snapshot. As mentioned above, the facts may comprise RDF triples in some embodiments.

Catalog driver 132 then submits a transaction including the sets of facts to be deleted/inserted (i.e., the updates) to catalog engine 140. Advantageously, particularly in a multi-tenant environment, catalog driver 132 can process multiple requests concurrently, and catalog engine 140 can process multiple transactions concurrently.

Catalog engine 140 may determine if any of the updates of the transaction conflict with any updates of any transactions committed to log 150 after the timestamp of the snapshot. If no conflicts are identified, the transaction is appended to log 150 and catalog driver 132 receives an acknowledgement from catalog engine 140 that the transaction was committed. Catalog driver 132 communicates the acknowledgment to driver 130, which in turn coordinates with OTF driver 134 to update files 115 to complete the requested change (e.g., to delete data of a deleted column/table from files 115), if needed, and to return an acknowledgment to OTF client 120 if successful.

If a conflict is identified, catalog engine 140 returns an error to catalog driver 132. Catalog driver 132 may then obtain a new snapshot of the catalog metadata from catalog engine 140 and calculate new sets of updates based on the requested changes and the new snapshot. If a maximum number of retries is configured, then catalog driver 132 returns an error to OTF client 120 once the maximum number of retries is reached.

Driver 130 ensures that the database catalog of log 150 and the data stored in object store 110 are synchronized. Accordingly, if catalog driver 132 returns an error due to identification of a conflict with respect to a submitted transaction as mentioned above, driver 130 coordinates with OTF driver 134 to undo any partial operations which may have been already performed on files 115 in anticipation of the updates of the transaction. Similarly, if OTF driver 134 returns an error due to failure of a requested update to files 115, driver 130 coordinates with catalog driver 132 to abort/rollback the corresponding transaction committed to log 150.

Figure 2:
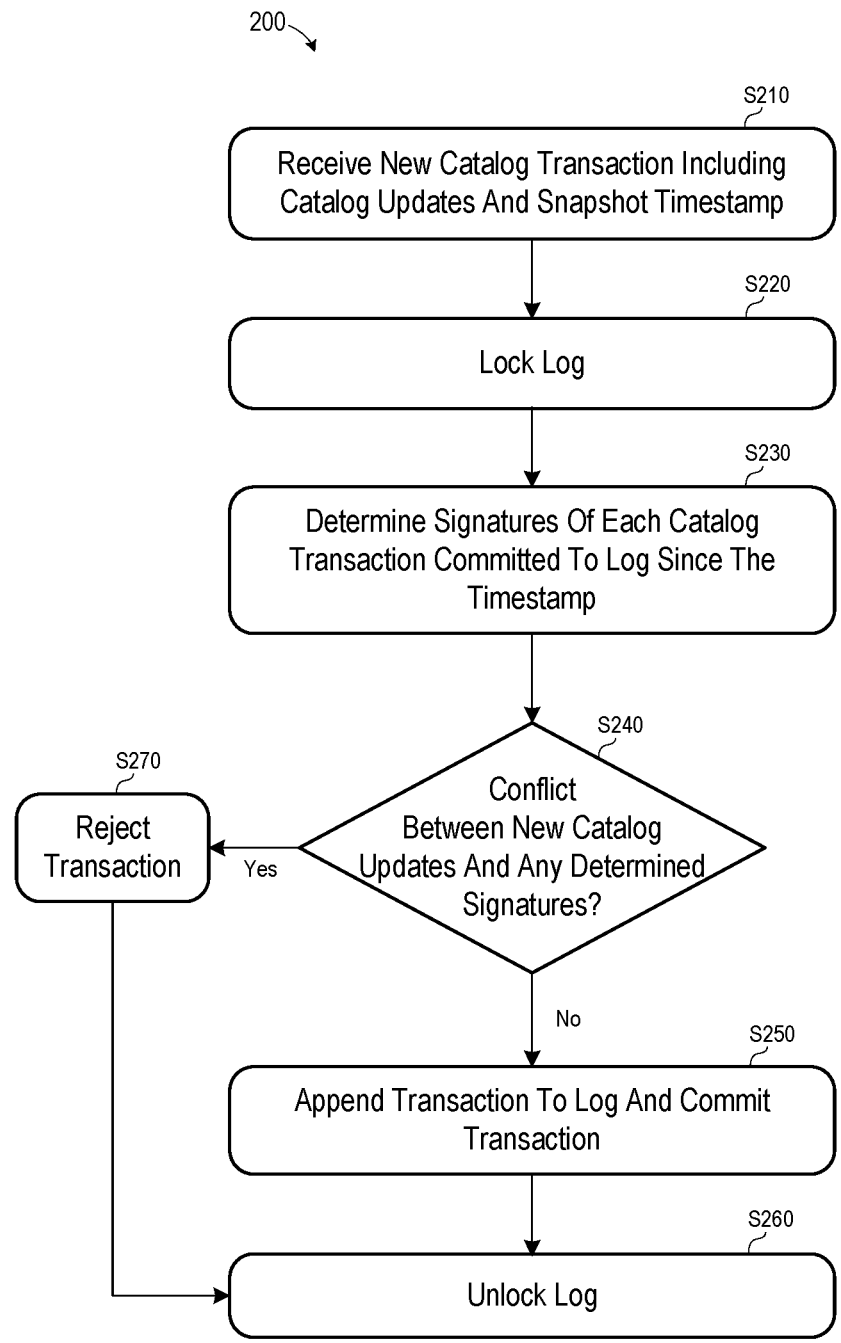
FIG. 2 comprises a flow diagram of a process to manage transactions on a log-structured database catalog according to some embodiments.

FIG. 2 comprises a flow diagram of process 200 to manage transactions on a log-structured database catalog according to some embodiments. In some embodiments, various hardware elements of architecture 100 execute program code to perform process 200. Process 200 and all other processes mentioned herein may be embodied in processor-executable program code read from one or more non-transitory computer-readable media, such as a hard disk drive, a volatile or non-volatile random-access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

Process 200 will be described as if performed by catalog engine 140 of architecture 100 but embodiments are not limited thereto. Prior to process 200, it will be assumed that a snapshot of a database catalog comprising zero (e.g., an empty database catalog) or more facts has been provided to a client, along with a timestamp of the snapshot. The timestamp indicates that the snapshot was calculated based on, and therefore incorporates, the updates of all transactions which were committed prior to the timestamp. The snapshot is not necessarily the most-recent snapshot (i.e., a snapshot incorporating all transactions which have been committed to the present time), but it may be desirable to provide a fairly recent snapshot to reduce the chance of conflicts.

A new catalog transaction is received at S210. The received transaction includes updates to the database catalog, and the updates may include deletions of particular facts of the previously-provided database snapshot and/or insertions of particular facts to the database snapshot. The new catalog transaction also includes the timestamp associated with the database snapshot. According to some embodiments, the transaction consists of a triple <D, I, t> where D is a set of facts to be deleted from the snapshot, I is a set of facts to be inserted to the snapshot, and t is the snapshot timestamp.

A log of database catalog transactions is locked at S220. Locking the log allows the steps of process 200 to proceed atomically until the log is unlocked. Next, signatures of each catalog transaction committed to the log since the timestamp are determined at S230. S230 therefore includes identification of each transaction committed to the log since the received timestamp, and determination of a respective signature for each identified transaction. Determination of a signature of a transaction according to some embodiments will be described in detail below.

At S240, it is determined whether a conflict exists between any of the updates of the new catalog transaction and any of the signatures determined at S230. According to some embodiments of S240, a hash function is used to generate a representation of each update of the new catalog transaction and each representation is evaluated with respect to each signature. For example, each signature may comprise a Bloom filter, and each Bloom filter may be used to determine whether a representation is a member of the set represented by the Bloom filter. A detailed example of S240 according to some embodiments is provided below.

If no conflict is determined at S240, the transaction is appended to the log and is committed at S250. Appending the transaction to the log may comprise determining a signature h based on the updates of the transaction and appending the quadruple <D, I, t, h> to the log. Including the already-computed signature h in the appended transaction facilitates the determination at S230 of the signatures of previously-appended transactions.

The transaction is rejected at S270 if a conflict is identified at S240. In some embodiments, a catalog driver receives the rejection and a new snapshot of the database catalog in response, and computes an updated triple <D', I', t'> of a new transaction based on the new snapshot and the previously-requested changes to the catalog. A request to commit the new transaction is transmitted and received at S210, and process 200 repeats as described above. As mentioned above, embodiments may allow up to a threshold number of such retries.

FIGS. 3-15 illustrate management of transactions on a log-structured database catalog according to some embodiments. In some embodiments, a catalog engine executes process 200 to implement the transaction management example of FIGS. 3-15.

Figure 3:
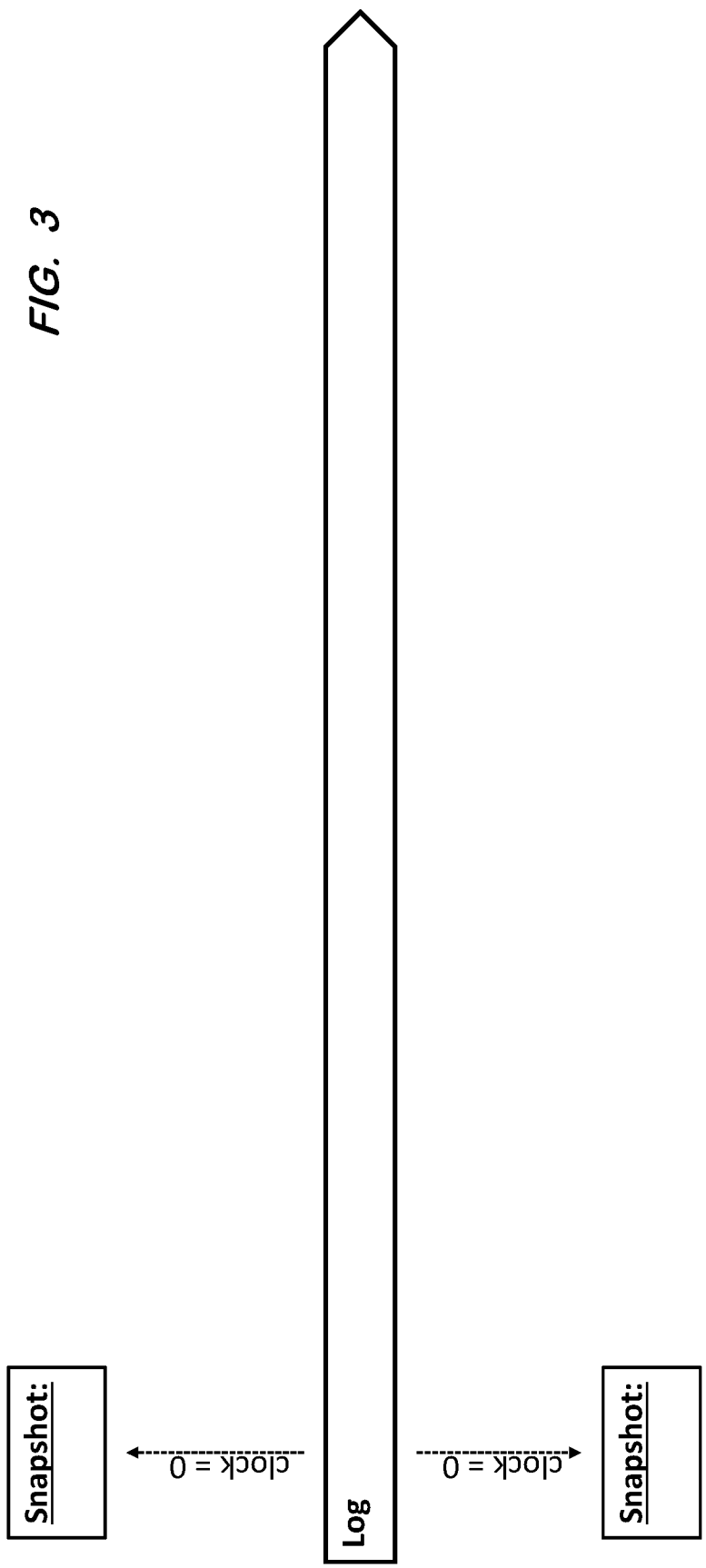
FIGS. 3-15 illustrate management of transactions on a log-structured database catalog according to some embodiments.

Initially, it is assumed that the log includes no transactions (i.e., the database catalog is empty. Two different clients (possibly associated with different tenants) have requested a snapshot of the database catalog. In response, and as shown in FIG. 3, a same snapshot of the database catalog is provided to each of the two clients, along with a timestamp of the snapshot (i.e., 0).

Figure 4:
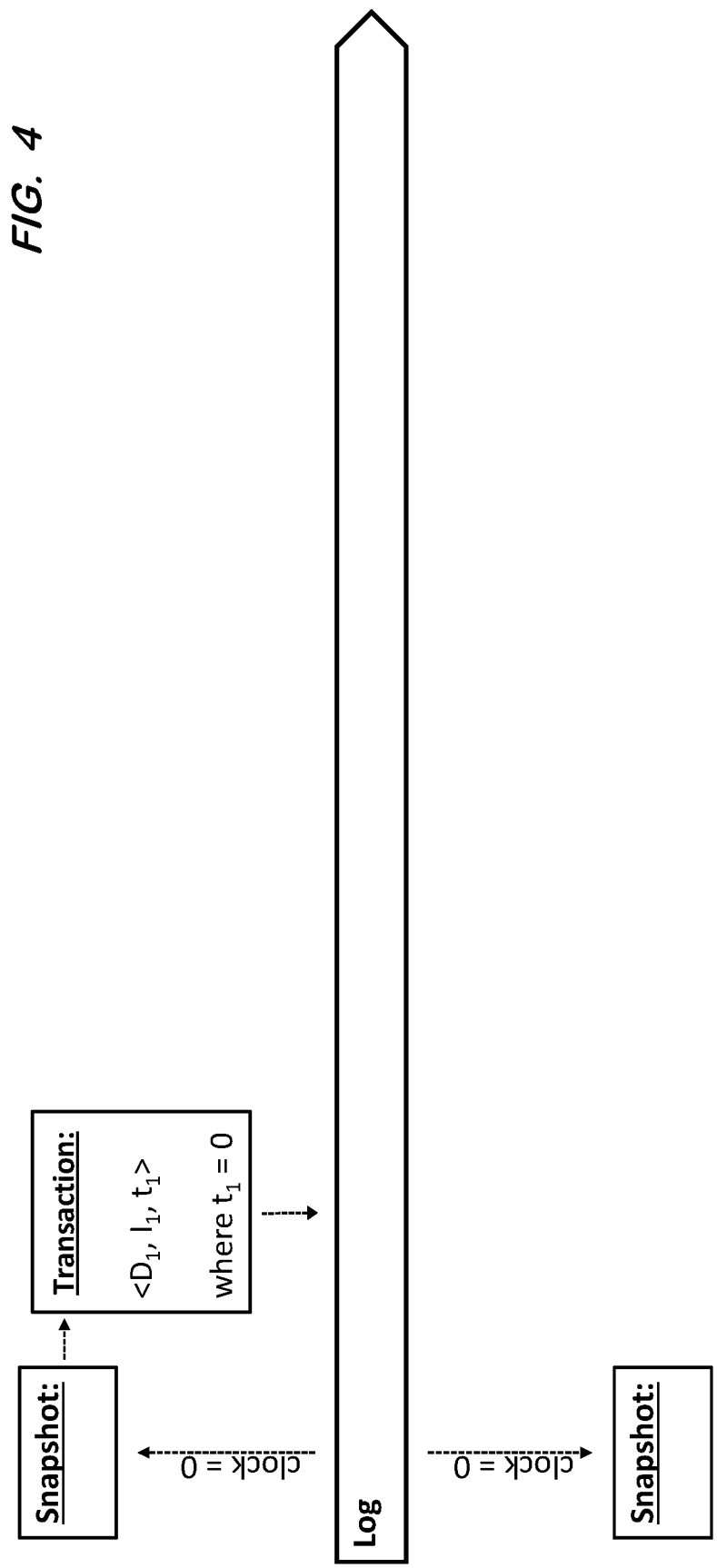
Figure 5:
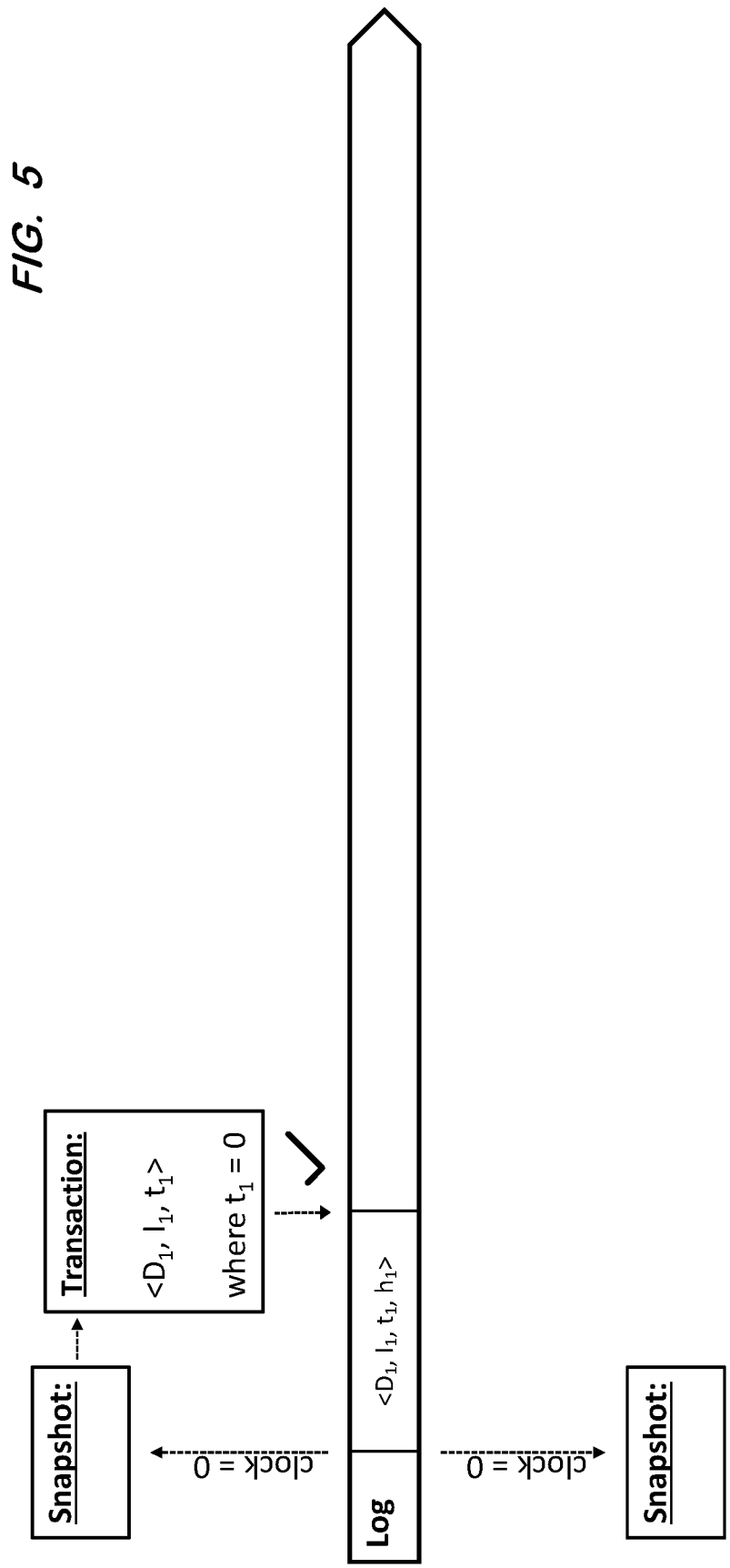

One of the clients then calculates updates to the snapshot based on desired changes as described above. A transaction is generated based on the updates and includes a timestamp (i.e., $t_1=0$) of the snapshot on which the updates are based. As shown in FIG. 4, the transaction including tuple <$D_1$, $I_1$, $t_1$> is transmitted (e.g., to a catalog engine) with a request to commit the transaction to the log. Since no transactions were appended to the log since $t_1$, the updates of the transaction do not conflict with any updates on the log. Accordingly, a signature $h_1$ is calculated based on the updates of the transaction and the tuple <$D_1$, $I_1$, $t_1$, $h_1$> is appended to the log and committed as shown in FIG. 5.

Figure 6:
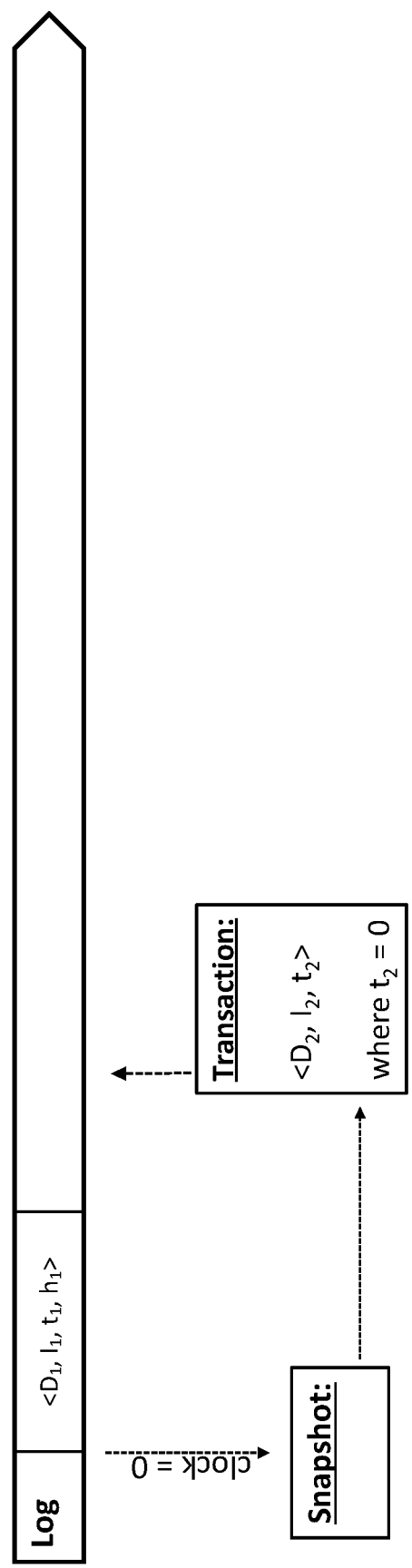

The other client which received the snapshot at time 0 then calculates updates to the snapshot based on its desired changes. A transaction <$D_2$, $I_2$, $t_2$> is generated based on these updates, where $t_2=0$ due to the timestamp of the snapshot on which updates $D_2$, $I_2$ are based. FIG. 6 illustrates transmission of a request to commit the transaction to the log.

Figure 7:
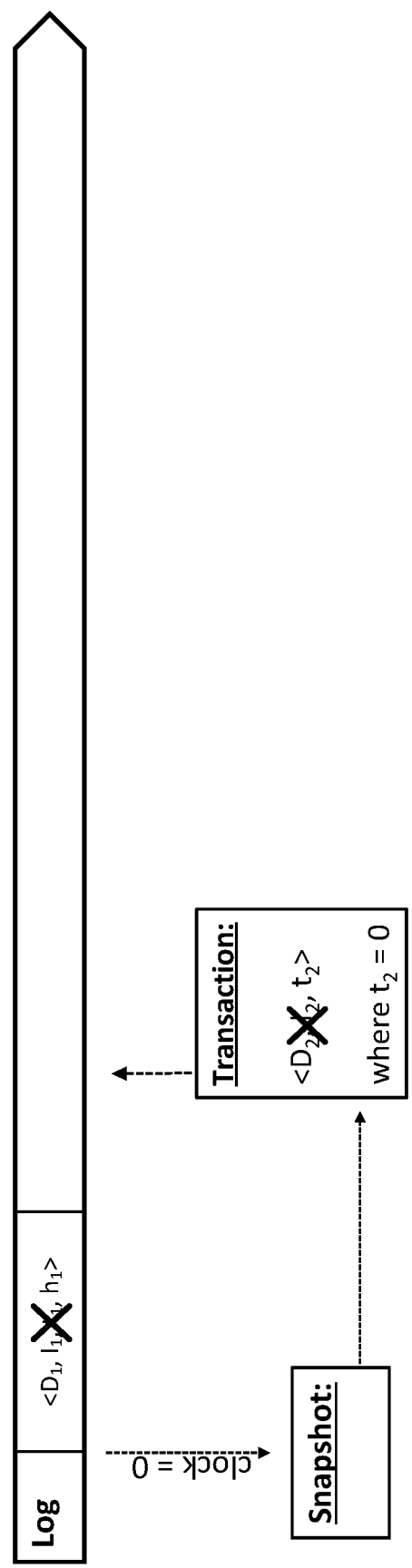

The transaction including tuple <$D_1$, $I_1$, $t_1$, $h_1$> was committed to the log since $t_2$ of transaction <$D_2$, $I_2$, $t_2$>. Accordingly, updates $D_2$, $I_2$ are evaluated against signature $h_1$ of the committed transaction. It is assumed that updates $D_2$, $I_2$ conflict with the updates represented by signature $h_1$ and the transaction is therefore rejected as shown in FIG. 7.

Figure 8:
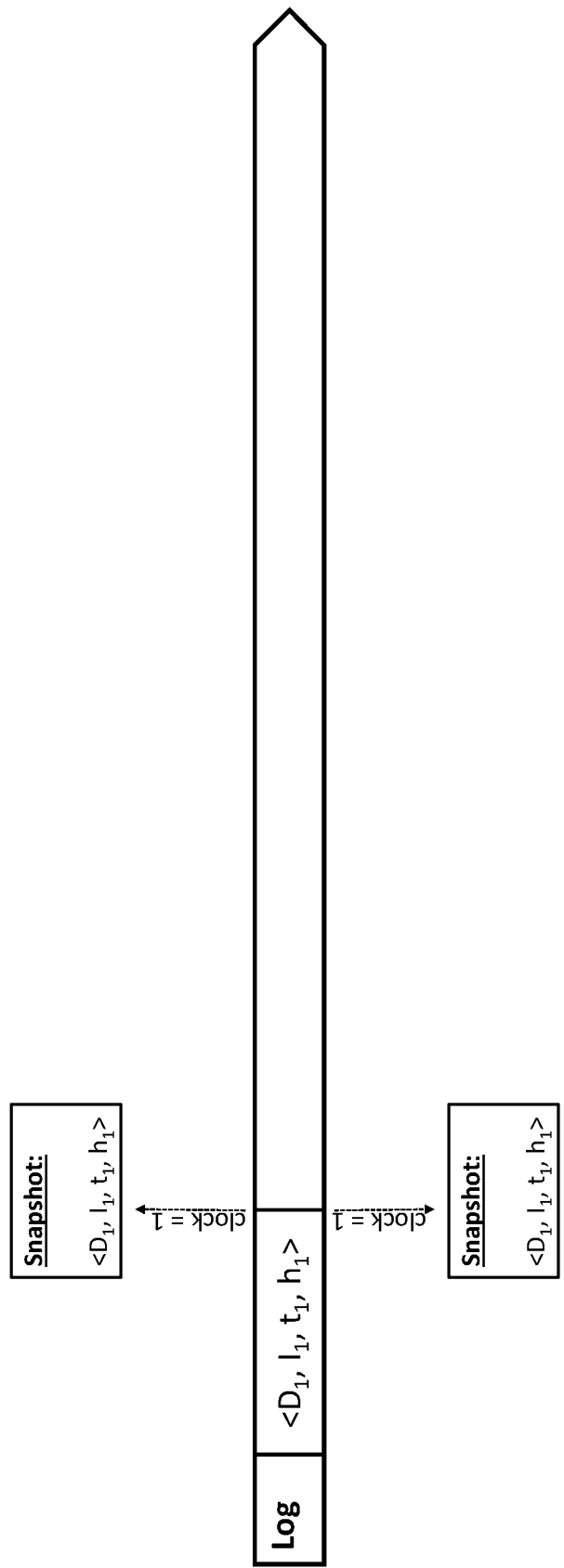

It is now assumed that two clients (either one of which may have received the t=0 snapshot) request a snapshot of the log after the transaction including tuple <$D_1$, $I_1$, $t_1$, $h_1$> is committed to the log and before any other transactions are committed. FIG. 8 illustrates providing the same snapshot of the database catalog, now including updates $D_1$, $I_1$, to each of the requesting clients. The snapshots are provided along with the timestamp of the snapshot (i.e., 1).

Figure 9:
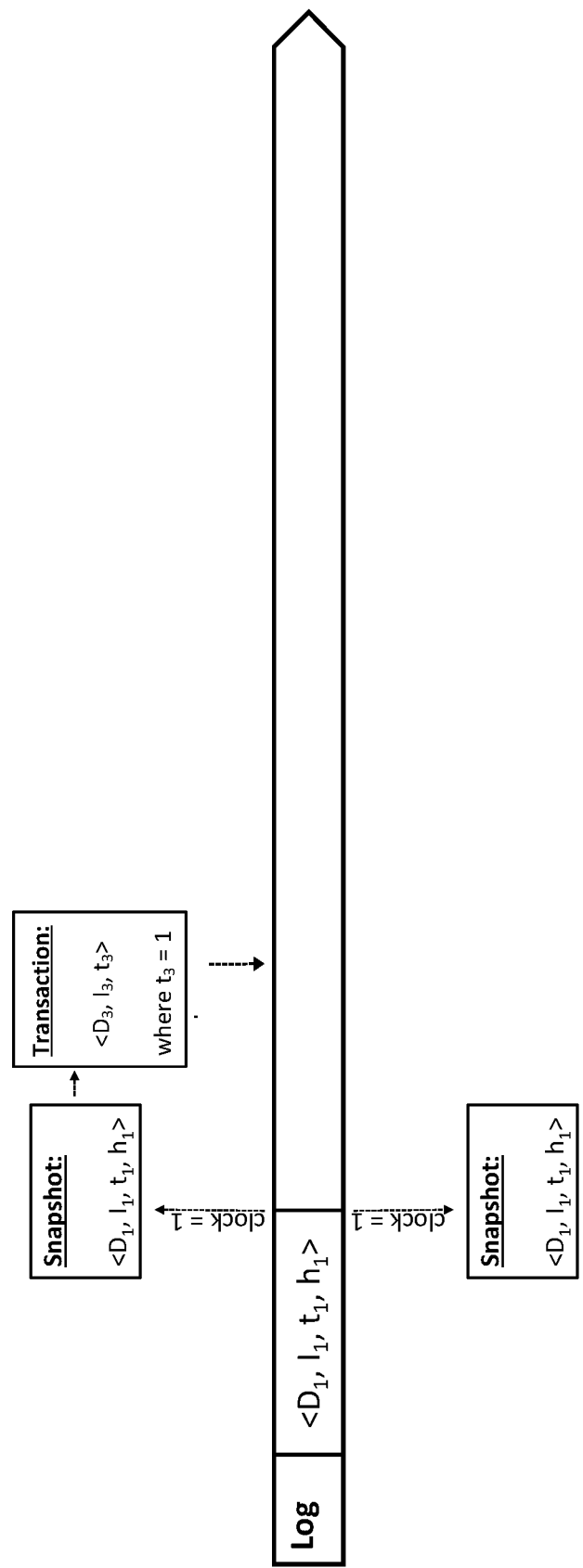

As shown in FIG. 9, one of the clients calculates updates $D_3$, $I_3$ and generates transaction <$D_3$, $I_3$, $t_3$> based on these updates. Timestamp $t_3=1$ to reflect the timestamp of the snapshot on which updates $D_3$, $I_3$ are based. A request to commit the transaction to the log is then transmitted.

Figure 10:
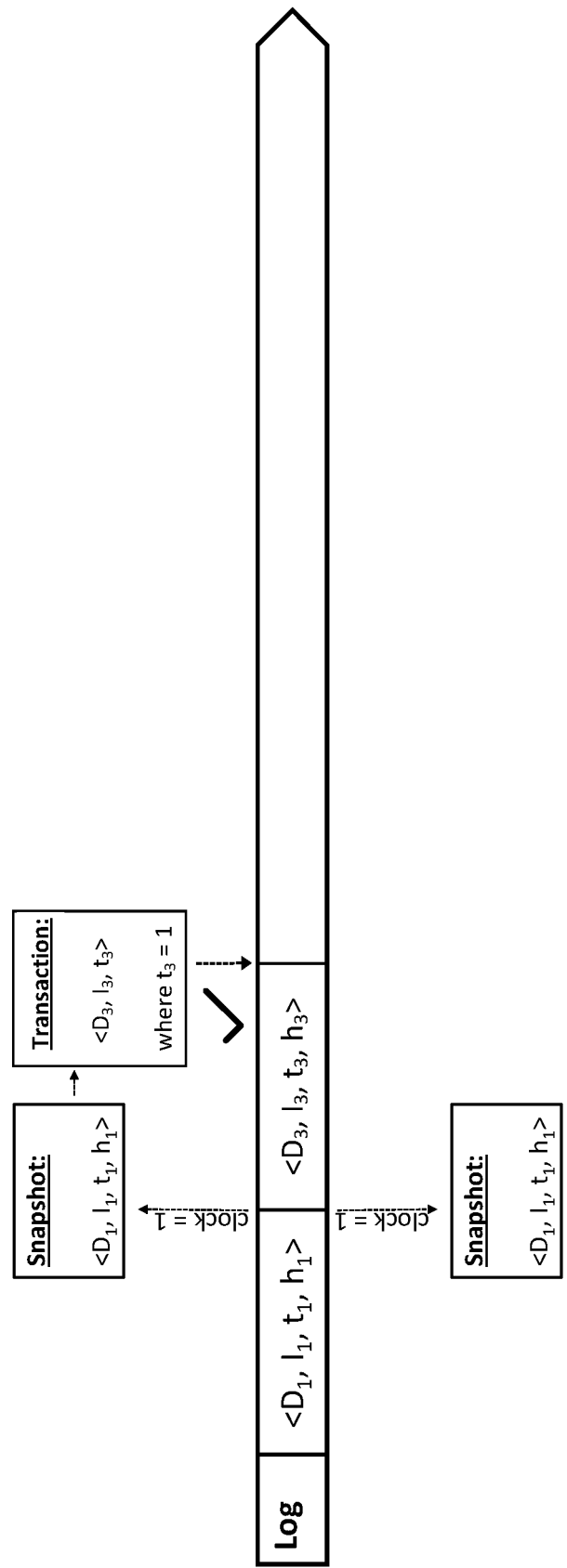

No transactions were appended to the log since $t_3=1$. Accordingly, no conflicts are identified and a signature $h_3$ is calculated based on updates $D_3$, $I_3$. The tuple <$D_3$, $I_3$, $t_3$, $h_3$> is appended to the log and committed as shown in FIG. 10.

Figure 11:
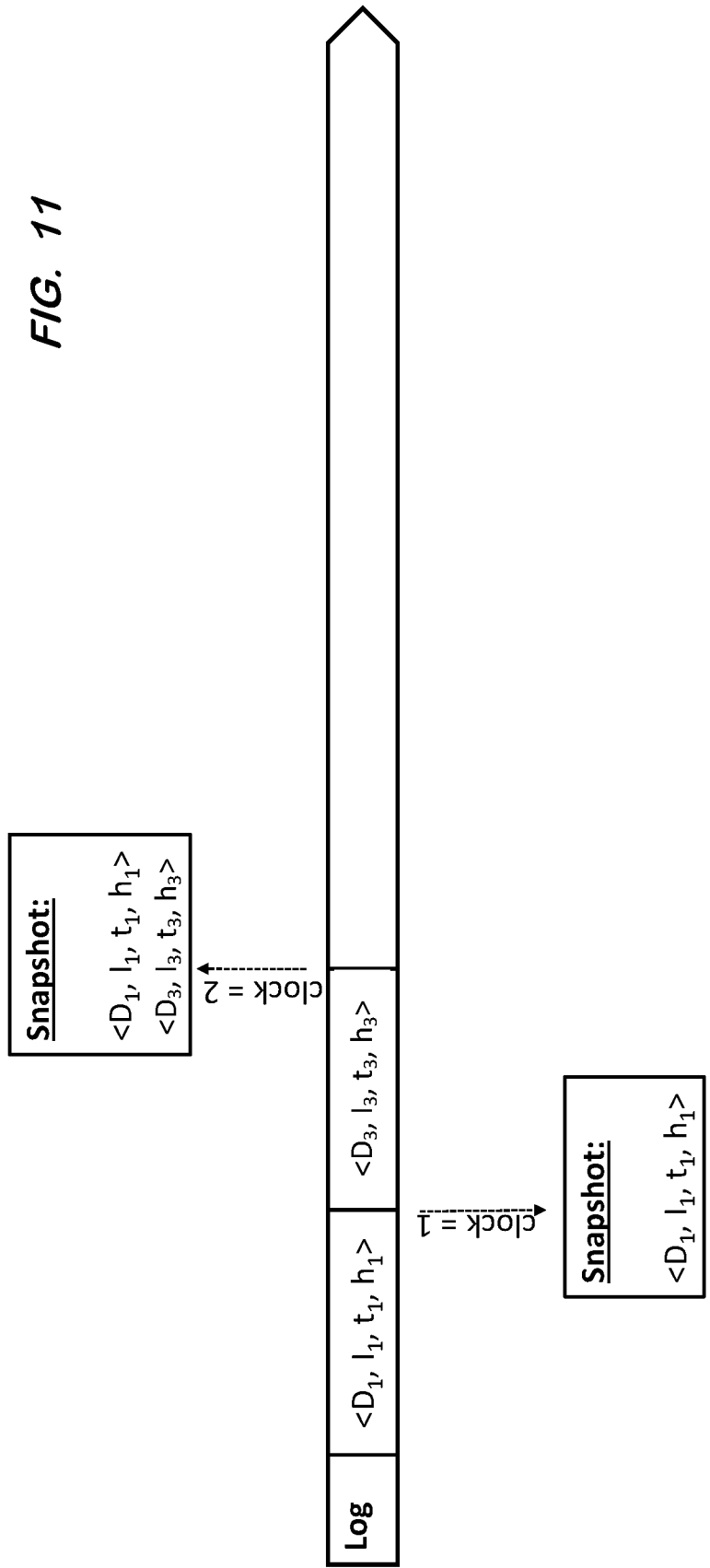

A next client (which may be any of the previously mentioned clients or another client) then requests a snapshot of the log after the transaction including tuple <$D_3$, $I_3$, $t_3$, $h_3$> is committed to the log and before any other transactions are committed. FIG. 11 illustrates providing a snapshot of the database catalog which now includes updates $D_1$, $I_1$, $D_3$, $I_3$, and a timestamp of snapshot (i.e., 2).

Figure 12:
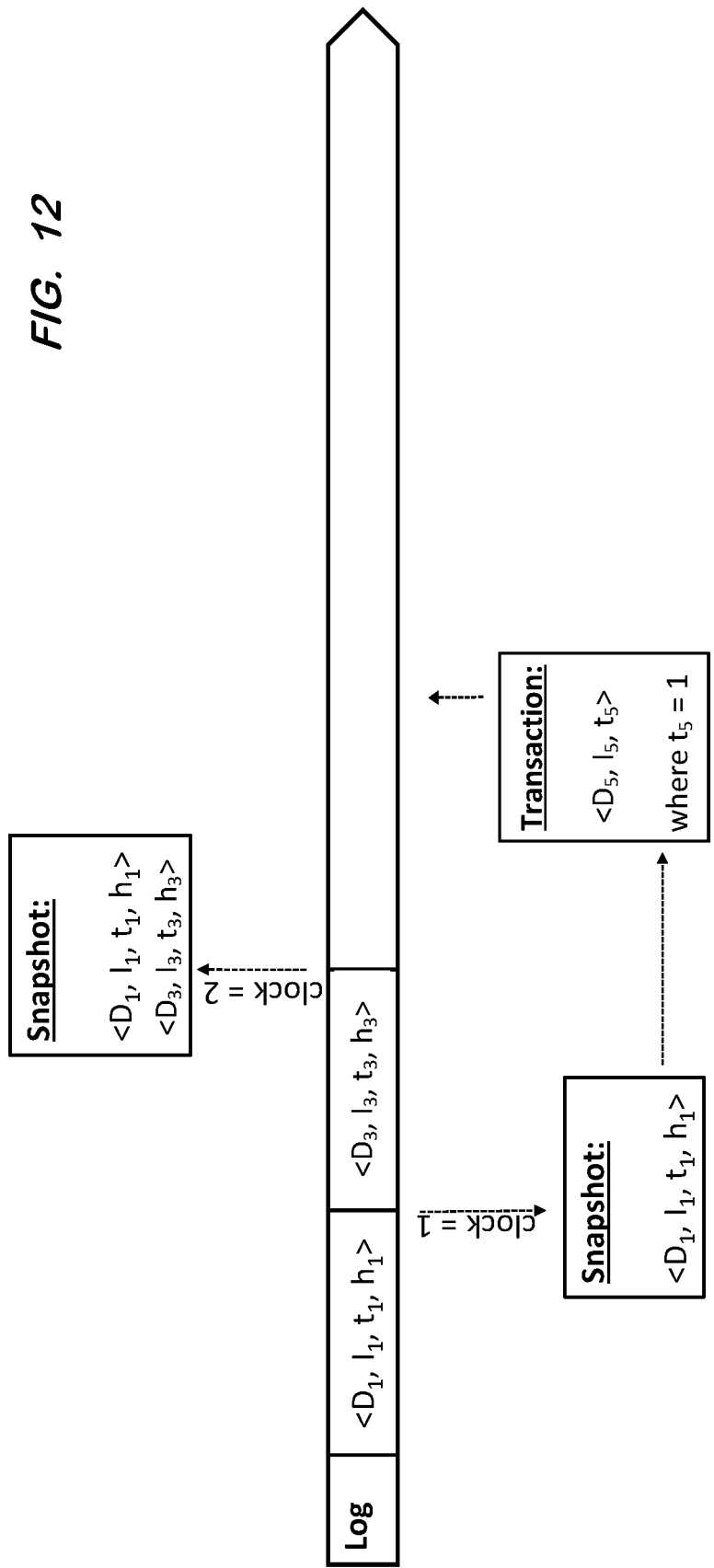

FIG. 12 illustrates updating of the snapshot associated with timestamp 1 by the other client which received the snapshot at FIG. 8. Updates $D_5$, $I_5$ are calculated based on the snapshot and transaction <$D_5$, $I_5$, $t_5$> is generated, where $t_5=1$. A request to commit the transaction to the log is then transmitted.

Figure 13:
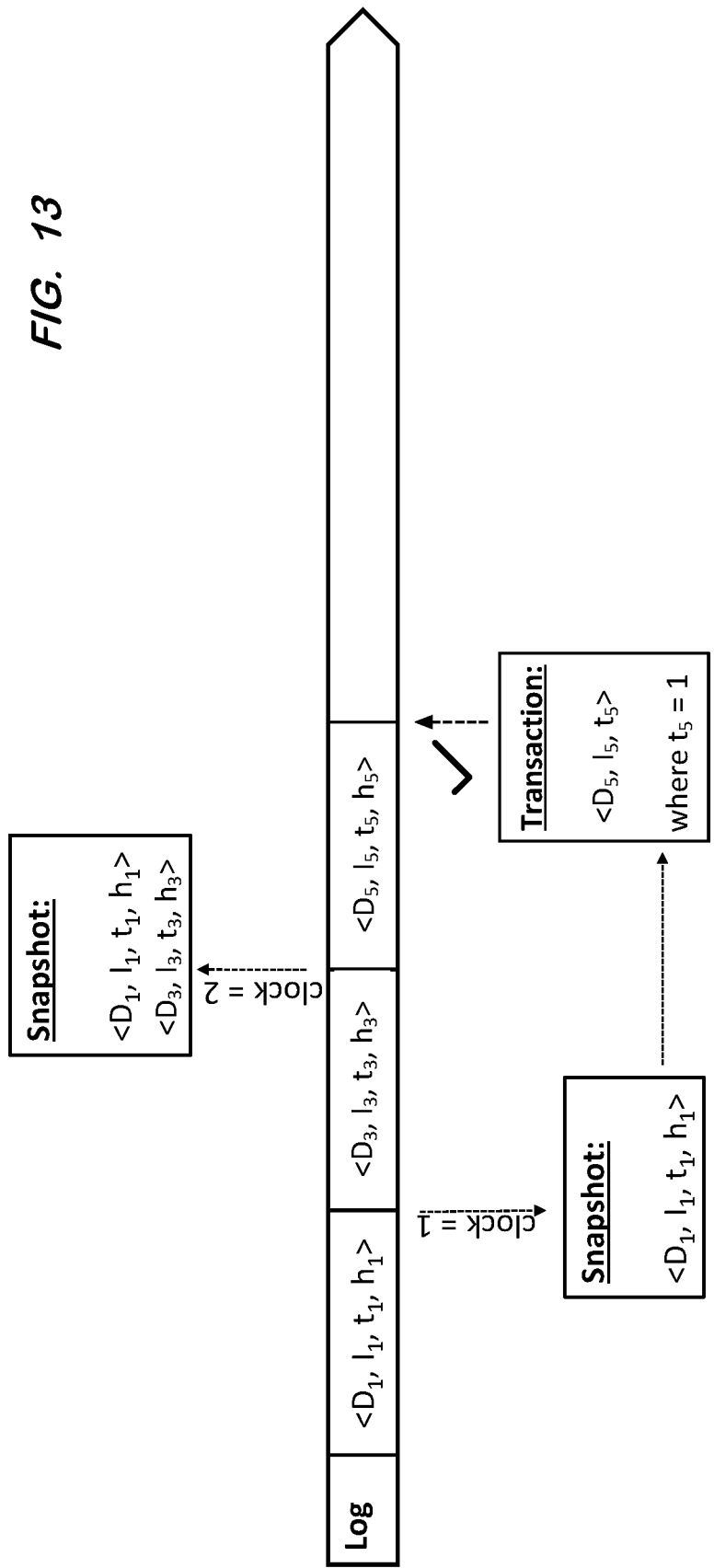

The transaction including tuple <$D_3$, $I_3$, $t_3$, $h_3$> was committed to the log since $t_5=1$. Updates $D_5$, $I_5$ are therefore evaluated against signature $h_3$ of the committed transaction. It is assumed that updates $D_5$, $I_5$ do not conflict with the updates represented by signature $h_3$. A signature $h_5$ is therefore calculated based on updates $D_5$, $I_5$ and the tuple <$D_5$, $I_5$, $t_5$, $h_5$> is appended to the log and committed as illustrated in FIG. 13.

Figure 14:
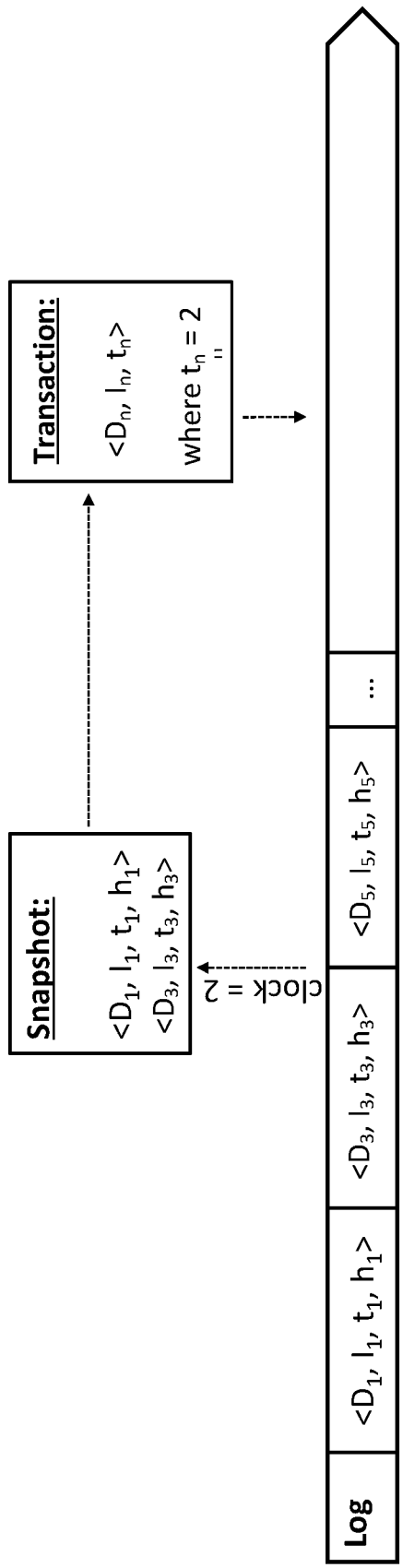

FIG. 14 illustrates transaction <$D_n$, $I_n$, $t_n$> generated by the client which received the snapshot associated with a timestamp of 2. It will be assumed that a request to commit this transaction is transmitted. In response, updates $D_n$, $I_n$ are evaluated against signature $h_5$ of committed transaction <$D_5$, $I_5$, $t_5$, $h_5$> to determine whether any conflicts exist between updates $D_n$, $I_n$ and updates $D_5$, $I_5$.

Figure 15:
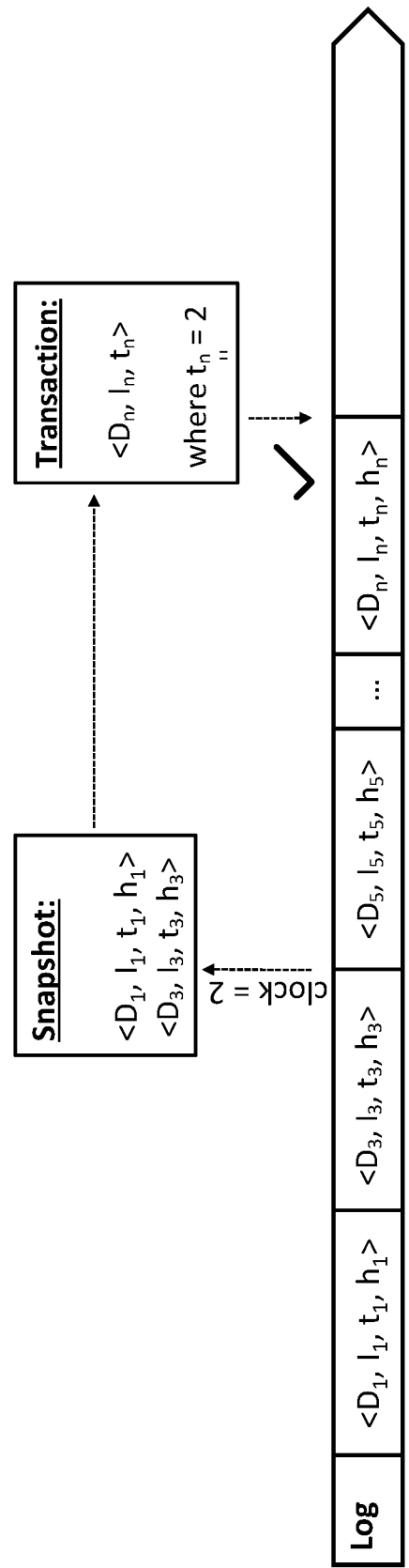

It is assumed that other transactions were committed to the log between $t_n=2$ and the time at which the request to commit transaction <$D_n$, $I_n$, $t_n$> was received. Accordingly, updates $D_n$, $I_n$ are also evaluated against the signatures of each of these other transactions to determine whether any conflicts exist between updates $D_n$, $I_n$ the updates of the other transactions. FIG. 15 illustrates a scenario in which no such conflicts exist, resulting in calculation of a signature $h_n$ based on updates $D_n$, $I_n$ and appending of the tuple <$D_n$, $I_n$, $t_n$, $h_n$> to the log.

FIGS. 16-26 illustrate representation of database artifacts using RDF triples according to some embodiments. Each triple represents a "fact" using a subject, predicate, and object. Embodiments use RDF triples to describe the main artifacts of a database, including but not limited to the database, the database schema, database tables, and table columns.

Triple definition 1610 of FIG. 16 defines the assignment of an ID to each database artifact. Various database artifacts can be associated with properties, and each property is assigned an ID according to triple definition 1620. Triple definitions 1630, in turn, illustrate assignment of a name and a value to a property of a database artifact.

Triplet definitions 1710 of FIG. 17 are used to describe a database artifact. For describing database artifacts, the symbol R is used next to triplets that can be used multiple times to describe the same artifact. For example, FIG. 17 depicts that a database artifact can have multiple properties.

Triplets 1810 of FIG. 18 describe an instance of a database artifact and thereby conform to triplet definitions 1710. Triplets 1910 of FIG. 19 describe two properties of the database instance of triplets 1810. According to some embodiments, a catalog driver generates triplets 1810 and 1910 as a set of insert updates of a transaction in response to a statement such as CREATE DATABASE employees COMMENT 'For software companies' LOCATION '/users/temp' WITH DBPROPERTIES (ID=001, Name='John').

Triplet definitions 2010 of FIG. 20 are used to describe a table artifact according to some embodiments. Similarly, column artifacts of a table artifact may be defined using triplet definitions 2110 of FIG. 21. If a column is to belong to an ordered set, triplet definitions 2210 may be used to define the order and triplet definitions 2310 of FIG. 23 may be used to define the sort order.

Triplets 2410 define an instance of a table artifact based on triplet definitions 2010 and columns of the table based on triplet definitions 2210. According to some embodiments, triplets 2410 are generated as a set of insert updates of a transaction in response to a statement such as CREATE TABLE student_partition_bucket USING parquet PARTITIONED BY (age) AS SELECT*FROM student.

FIG. 25 is an example of updates generated in response to a command such as ALTER TABLE TNameOld RENAME TO TNameNew. In particular, triplet 2510 is generated as a fact to be deleted and triplet 2520 is generated as a fact to be inserted.

FIG. 26 also illustrates a set of facts to be inserted into or deleted from a database catalog. For example, the statement ALTER TABLE student_partition_bucket RENAME COLUMN age TO studentAge may result in generation of a transaction including the first three triplets and the last triplet of triplets 2610 as insertion updates and the fourth through seventh triplets of triplets 2610 as deletion updates.

If a table is dropped, the triplets of all artifacts of the table and the triplets of all its associated artifacts are deleted. For example, an instruction to drop table student_partition_bucket described by triplets 2410 results in deletion of all triples for columns C1234567, C1234568, and C1234569, and deletion of all triplets for table T12345.

Figure 27:
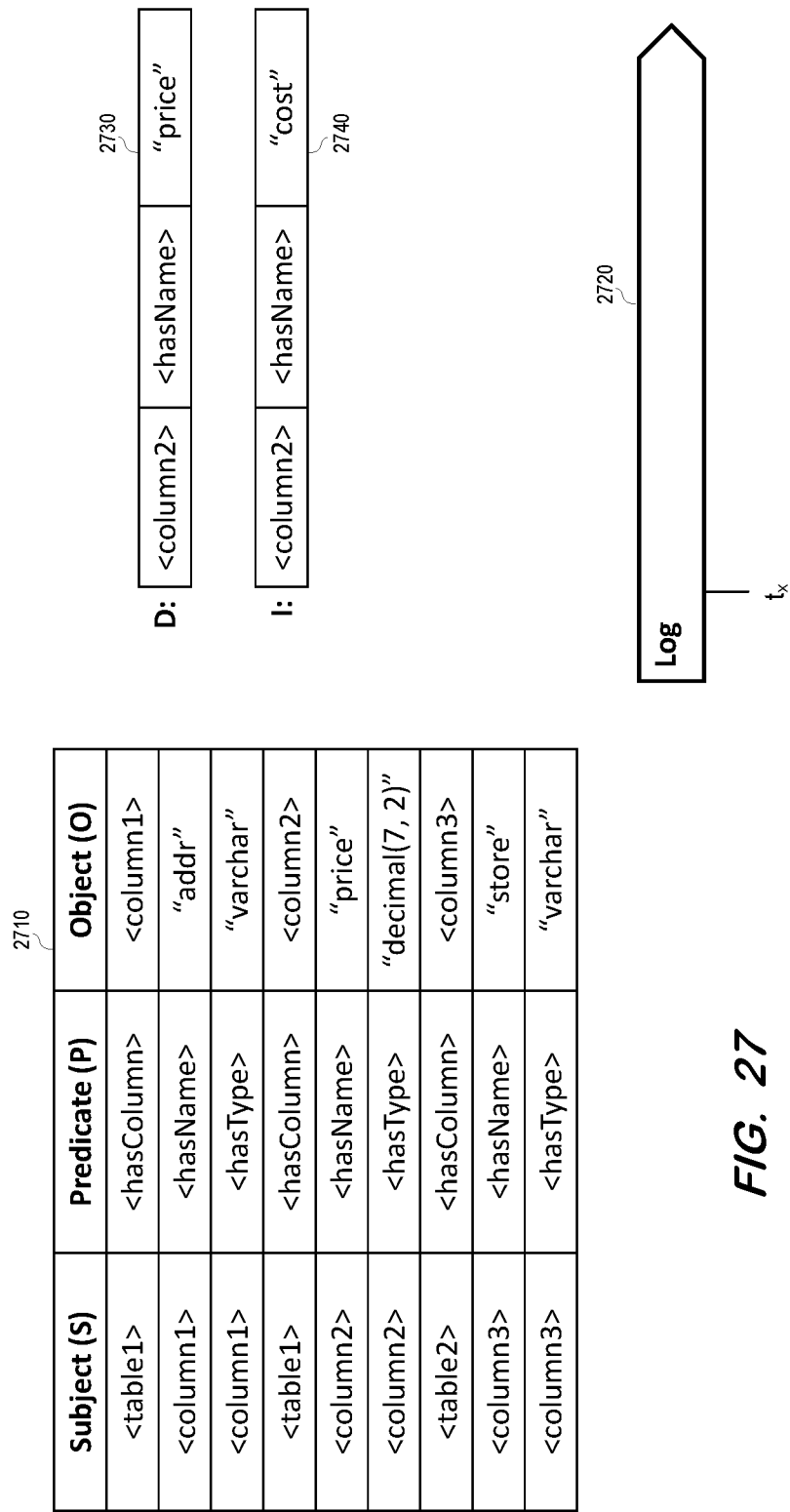
FIGS. 27-29 illustrate catalog updates of a catalog transaction according to some embodiments.

FIG. 27 illustrates triplets 2710 defining a database catalog according to some embodiments. It will be assumed that triplets 2710 were appended to log 2720 via transactions as described above prior to time $t_x$ and represent the state of the database catalog at time $t_x$. The database catalog at time $t_x$ may include many more triplets than triplets 2710.

It will be assumed that a client receives a snapshot of the database catalog at time $t_x$ consisting of triplets 2710. It is also assumed that the client wishes to change the name of column2 of table1. Accordingly, a transaction is generated including updates 2730 and 2740. Update 2730 is a triplet representing a fact to be deleted from triplets 2710 and update 2740 is a triplet representing a fact to be inserted into triplets 2710. The transaction includes a timestamp $t_1 = t_x$ because the updates are based on a snapshot of the catalog at $t_x$.

Figure 28:
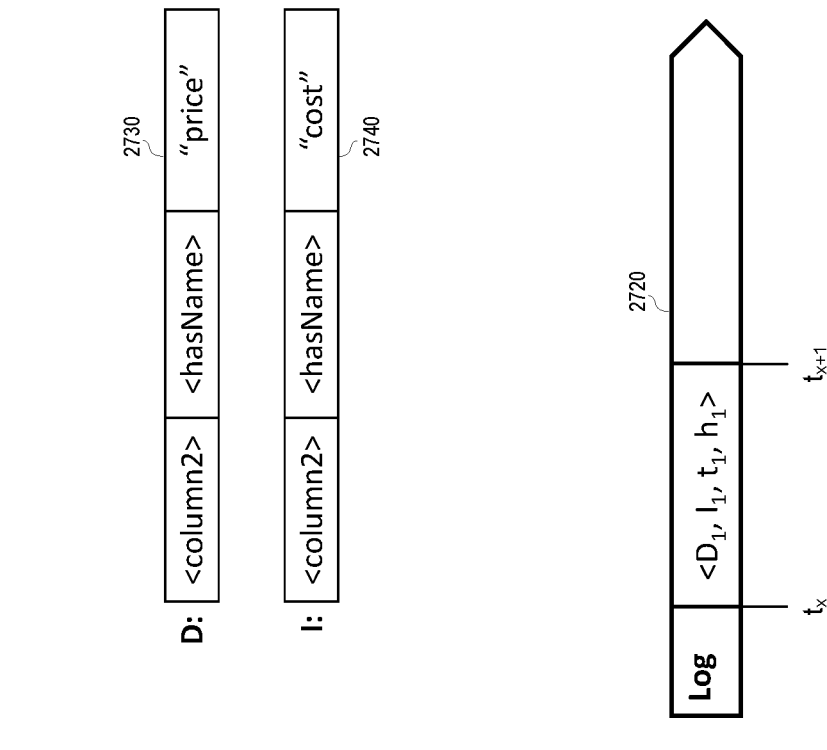

Assuming no conflicts exist, the transaction is appended to log 2720 along with signature $h_1$ of the transaction, as shown in FIG. 28. Triplets 2810 represent the state of the database catalog at time $t_{x+1}$, in which the name of column2 has been changed to "cost". It should be noted that while triplets 2810 depict the logical state of the database catalog, log 2720 may store all prior updates, including "deleted" fact 2730. Alternatively, a checkpoint may be established at $t_{x+1}$ which deletes all previously-deleted facts from log 2720.

Figure 29:
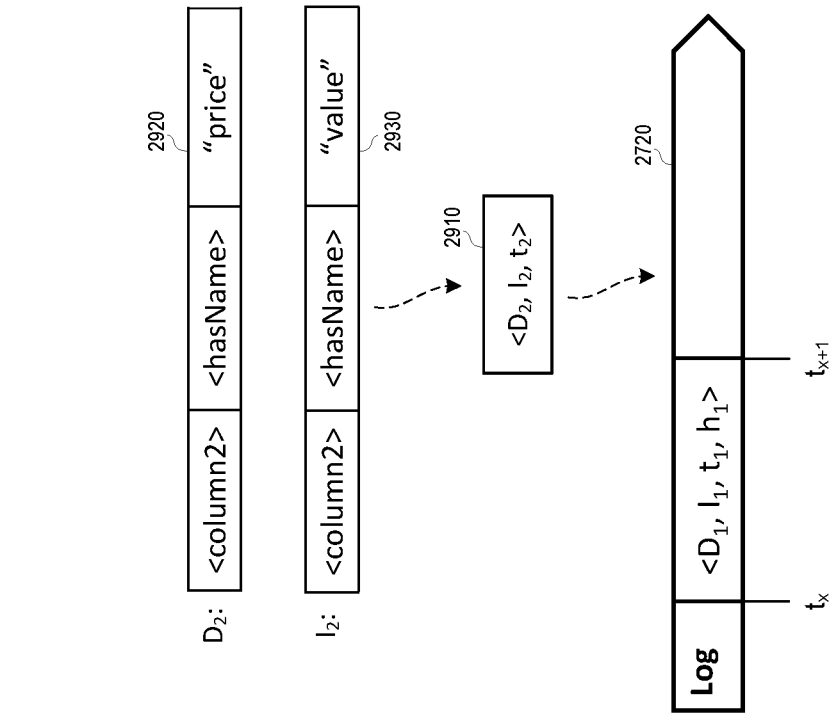

It will now be assumed that a client receives a snapshot of the database catalog at time $t_x$ consisting of triplets 2710. The client wishes to change the name of column2 of table1 to "value". Transaction 2910 is therefore generated including updates 2920 and 2930 of FIG. 29. Update 2920 is a triplet representing a fact to be deleted from triplets 2810 and update 2930 is a triplet representing a fact to be inserted into triplets 2810. Transaction 2910 includes a timestamp $t_2 = t_x$ because updates 2920 and 2930 are based on a snapshot of the database catalog at $t_x$.

Prior to committing transaction 2910 to log 2720, and as described above with respect to process 200, it is determined whether the updates of transaction 2910 conflict with the updates of any transactions committed to log 2720 after the snapshot timestamp of transaction 2910. In the present example, it is determined whether the updates of transaction 2910 conflict with signature $h_1$.

Figure 30:
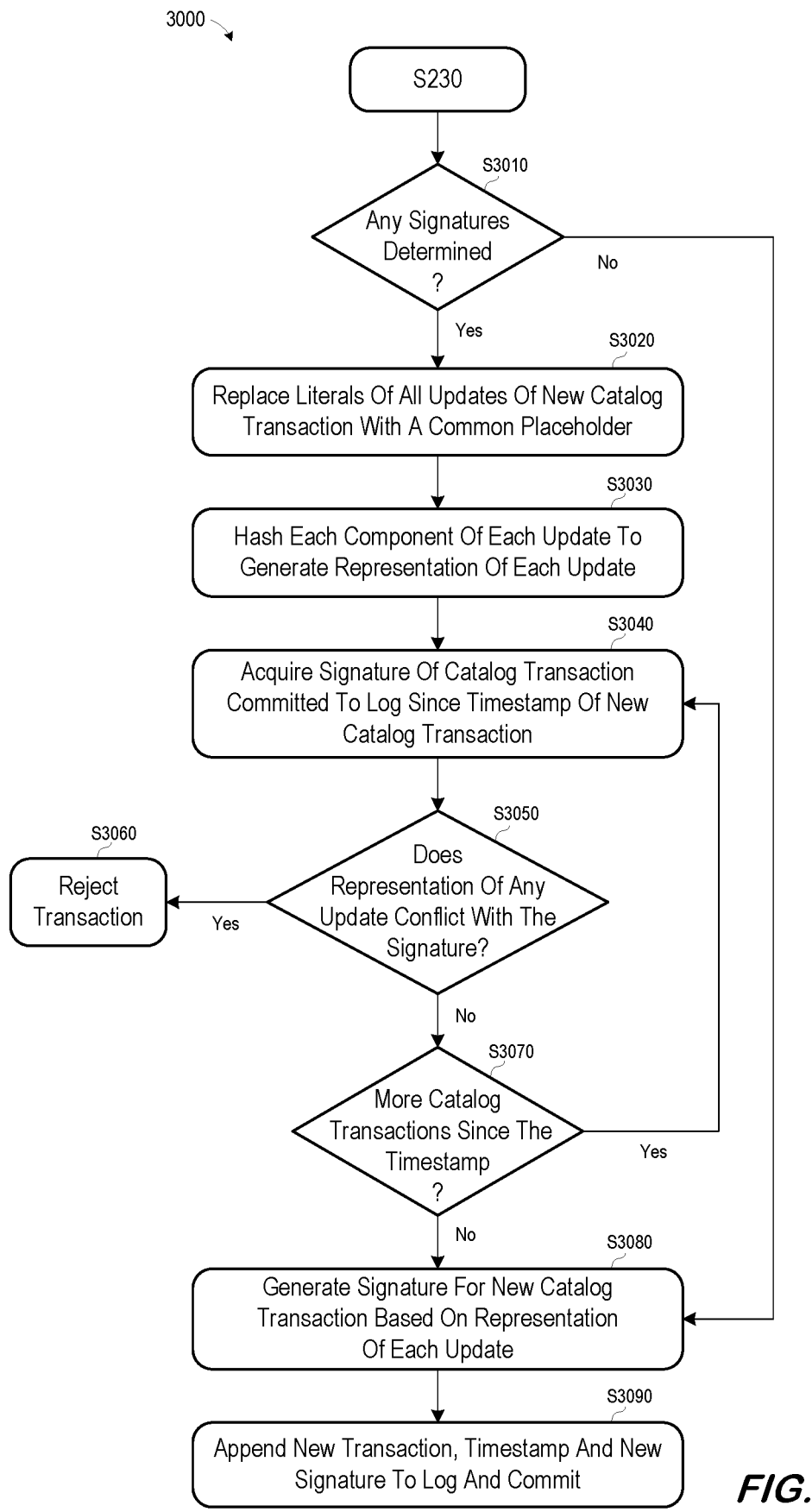
FIG. 30 comprises a flow diagram of a process to identify conflicts between catalog transactions according to some embodiments.

FIG. 30 comprises a flow diagram of process 3000 to identify conflicts between catalog transactions according to some embodiments. Process 3000 may comprise an implementation of S240, S250 and S270 of process 200. Accordingly, S3010 occurs after S230 of process 200, at which, in response to a request to commit a new catalog transaction, signatures of each catalog transaction committed to the log since the timestamp of the new transaction are determined.

At S3010, it is determined whether any signatures were determined at S230, i.e., whether any catalog transactions have been committed to the log since the timestamp of the new transaction. If so, flow proceeds to S3020. With respect to the example of FIG. 29, signature $h_1$ is determined at S230 as having been committed to log 2720 since timestamp $t_2 = t_x$ of transaction 2910.

Figure 31:
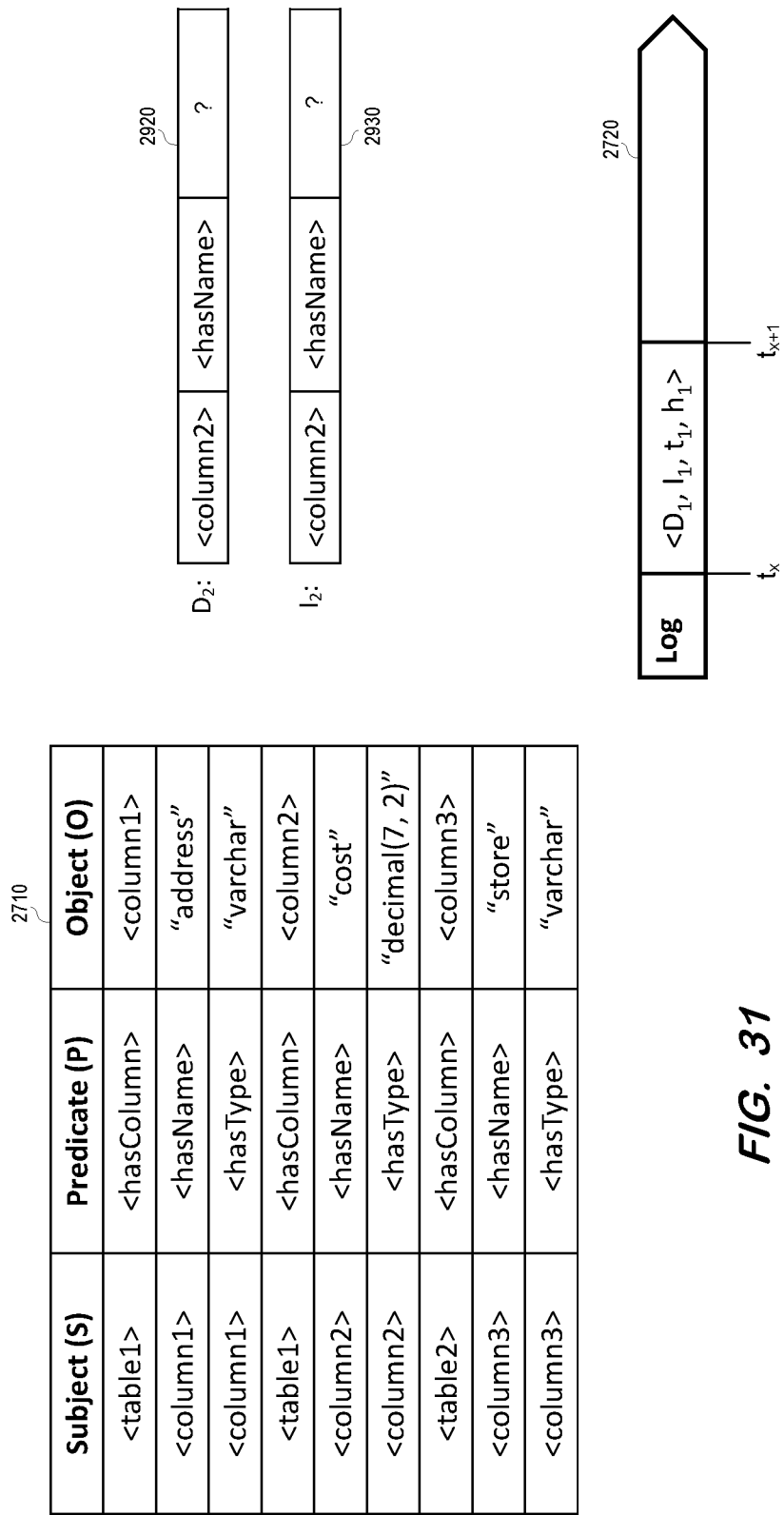
FIGS. 31-34 illustrate the use of transaction signatures to identify conflicts between catalog transactions according to some embodiments.

Literals of all the updates of the new catalog transaction are replaced with a common placeholder at S3020. FIG. 31 shows the literals "price" and "value" of updates 2920 and 2930 after replacement with "?". Any common placeholder may be used in some embodiments.

Figure 32:
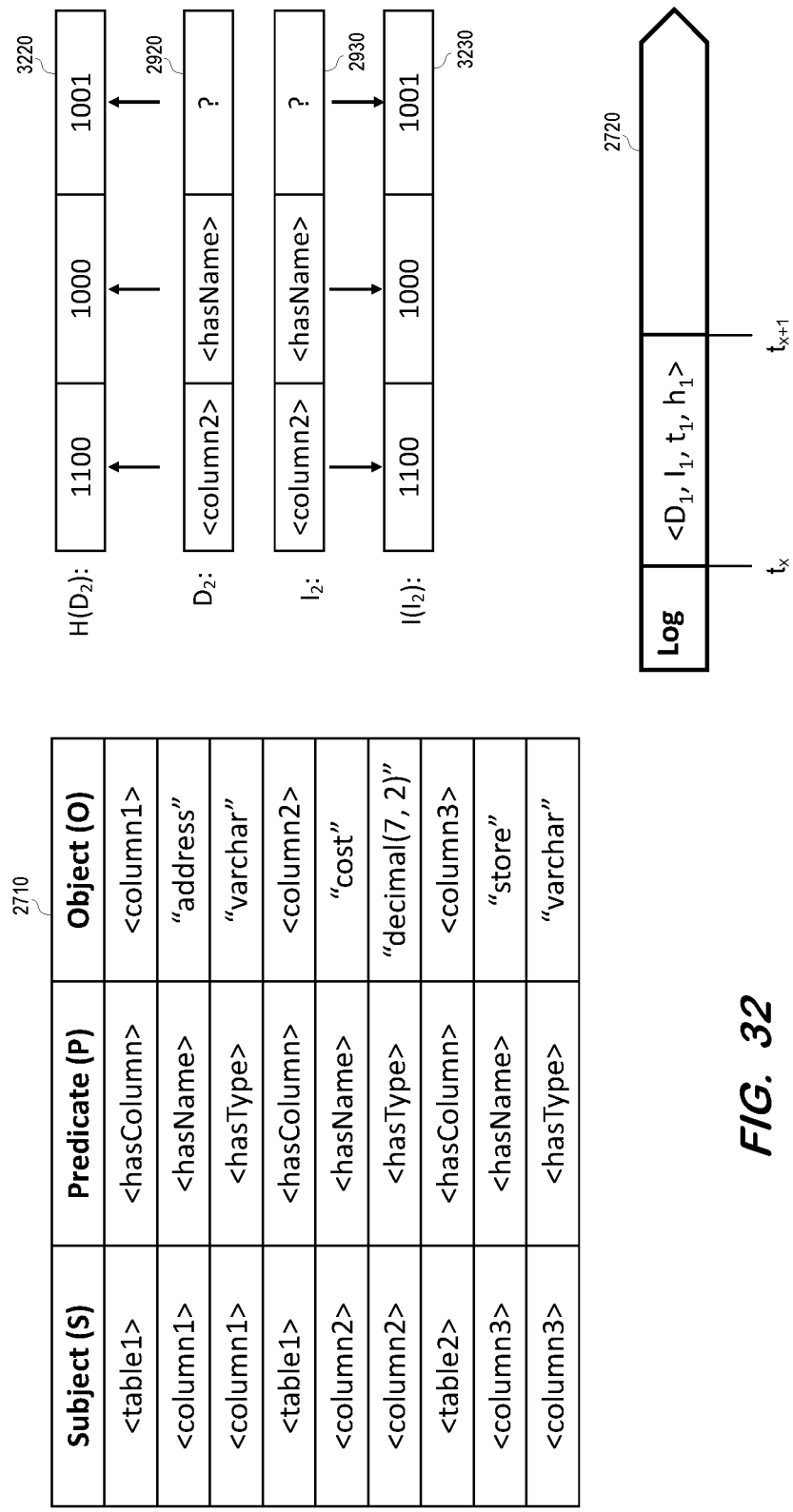

Each component of each update is hashed at S3030 to generate update-specific representations. Continuing the present example, FIG. 32 illustrates application of a hash function to component <column2> of update 2920 to generate hash "1100", application of a hash function to component <hasName> of update 2920 to generate hash "1000", and application of a hash function to "?" of update 2920 to generate hash "1001". The hashes are concatenated to generate resulting representation 3220 (i.e., "110010001001") of update 2920.

Similarly, a hash function is applied to components <column2>, <hasName>, and "?" of update 2930 are to generate respective hashes "1100", "1000" and "1001". As above, representation 3230 of update 2930 comprises the concatenation (i.e., "110010001001") of the hashes.

Figure 33:
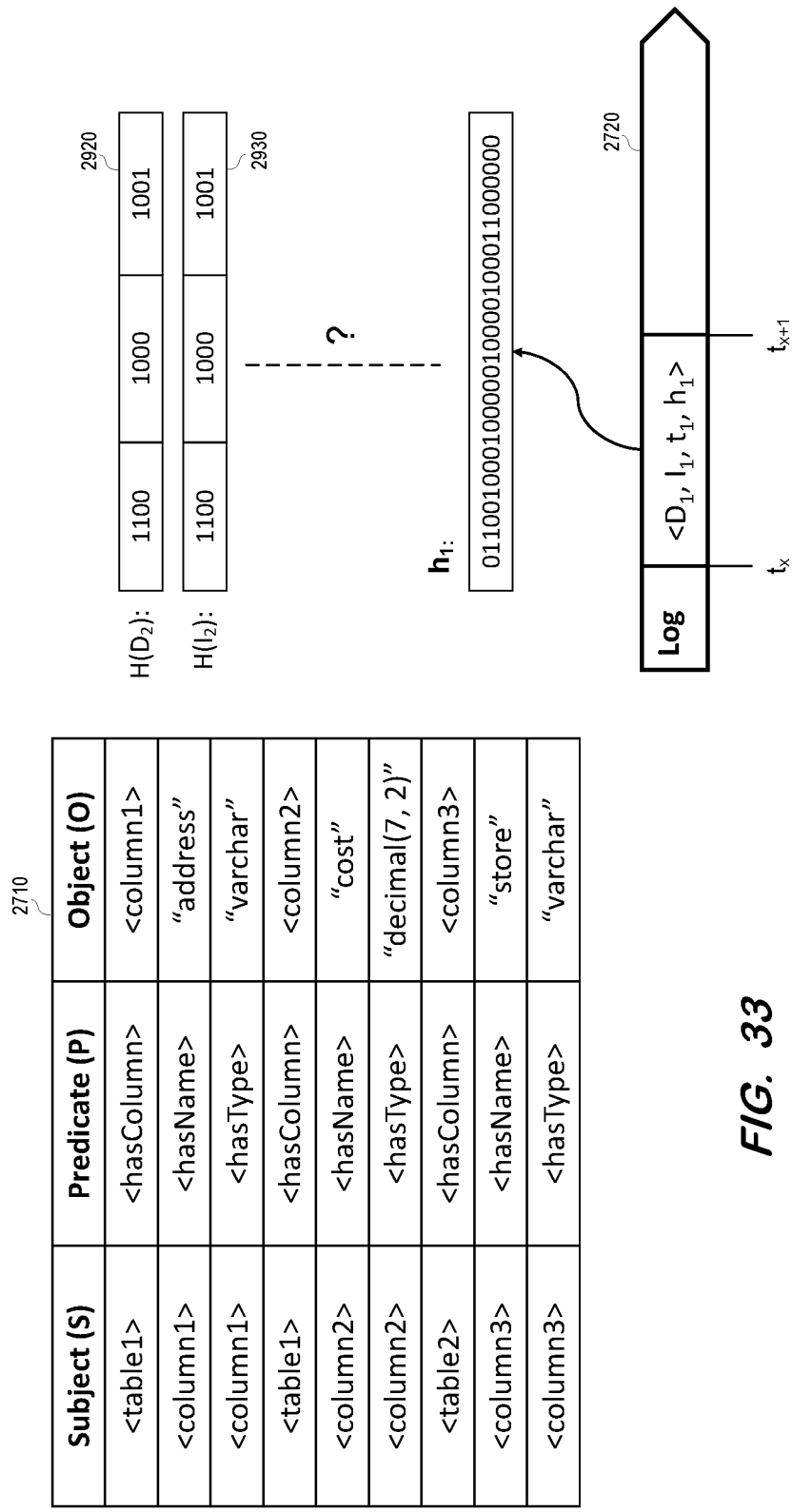

At S3040, a signature is acquired from the log. The signature is a signature of a catalog transaction which was committed to the log since the timestamp of the new catalog transaction. FIG. 33 shows an example of signature $h_1$ of transaction $<D_1, I_1, t_1, h_1>$ which may be acquired from log 2720 at S3040. Signature $h_1$ may comprise a Bloom filter generated based on updates $D_1$, $I_1$ according to some embodiments.

At S3050, it is determined whether the generated representation of any update of the new transaction conflicts with the acquired signature. With respect to FIG. 33, S3050 comprises determining whether either of representations 3220 or 3230 conflict with signature $h_1$. The determination at S3050 may include a determination of whether any of the updates belongs to a set represented by the signature.

As is known in the art, a Bloom filter may be used to add elements to a set and to determine whether an element is a member of a set. Accordingly, each of representations 3220 and 3230 is evaluated against signature $h_1$ to determine whether either representation is a member of the set of updates (i.e., $D_1$, $I_1$) as represented by signature $h_1$. Due to the use of hash functions and Bloom filters, the above-described implementation of S3050 may result in false positives. Accordingly, in case a representation of a particular update is determined to be a member of the set represented by a Bloom filter-embodied signature, S3050 may also include comparing the actual non-literal components of the particular update to the updates of the transaction associated with the signature to confirm whether a conflict exists.

Figure 34:
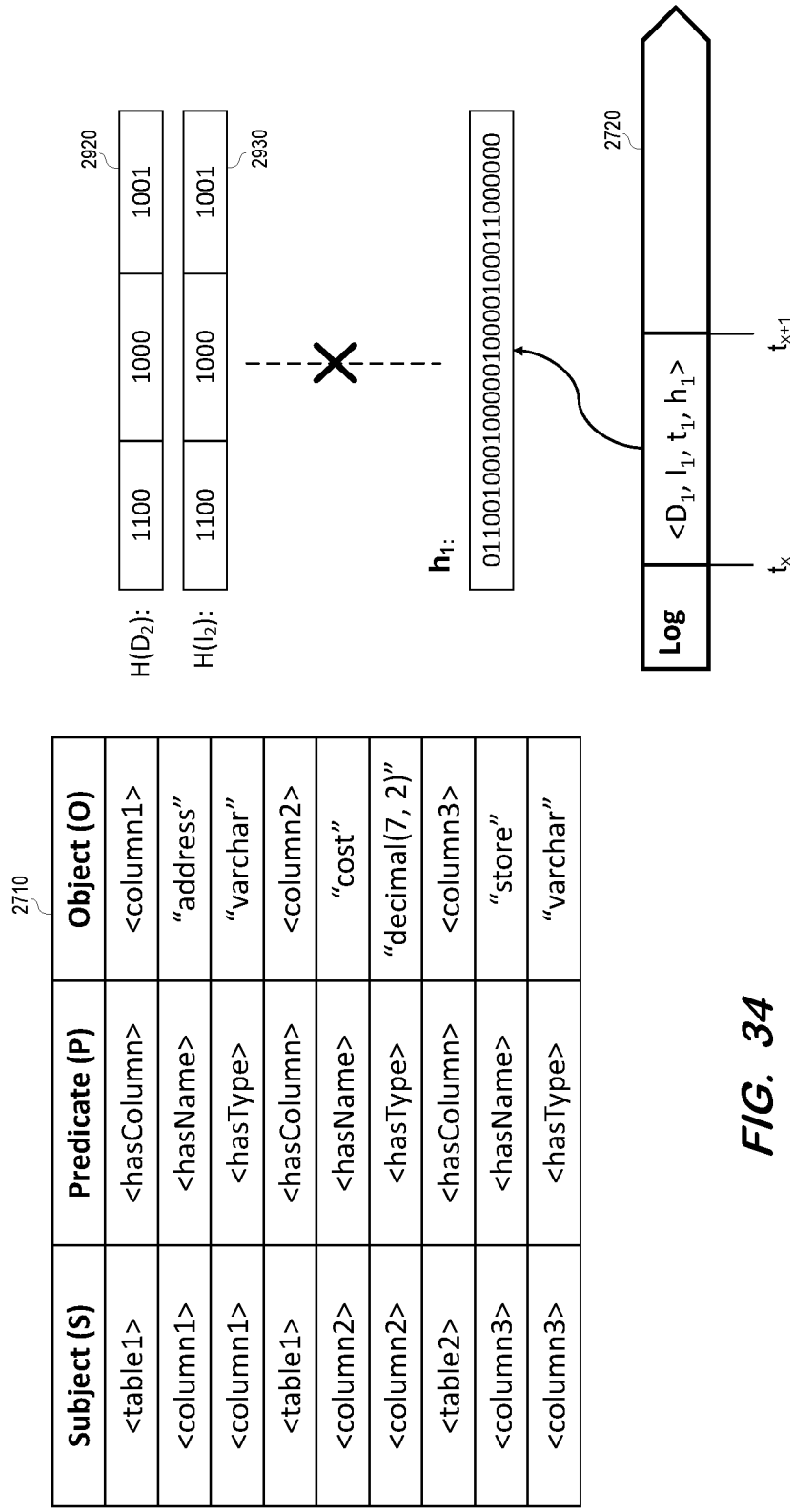

In the present example, it is determined that representations 3220 and 3230 are members of the set of updates represented by signature $h_1$, and that updates 2920 and 2930 actually conflict with updates $D_1$, $I_1$. Flow therefore proceeds to S3060 to reject the new transaction as illustrated in FIG. 34.

Flow proceeds from S3050 to S3070 if it is determined that none of the update representations of the new transaction conflict with the signature. At S3070, it is determined whether other catalog transactions were committed to the log since the timestamp of the new catalog transaction. If so, flow returns to S3040 and proceeds as described above to evaluate the updates of the new catalog transaction against the signature of the other transaction.

If the determination at S3070 is negative, a signature is generated for the new catalog transaction at S3080 based on the representations of each update of the new catalog transaction. Continuing the above example, the signature may be generated by adding the representation "110010001001" of update 2920 and the representation "110010001001" of update 2930 to a Bloom filter. Flow also proceeds directly to S3080 from S3010 to generate a signature if it is determined that no catalog transactions have been committed to the log since the timestamp of the new transaction. The new transaction including the updates, the timestamp of the transaction and the signature of the transaction is then appended to the log and committed at S3090.

Figure 35:
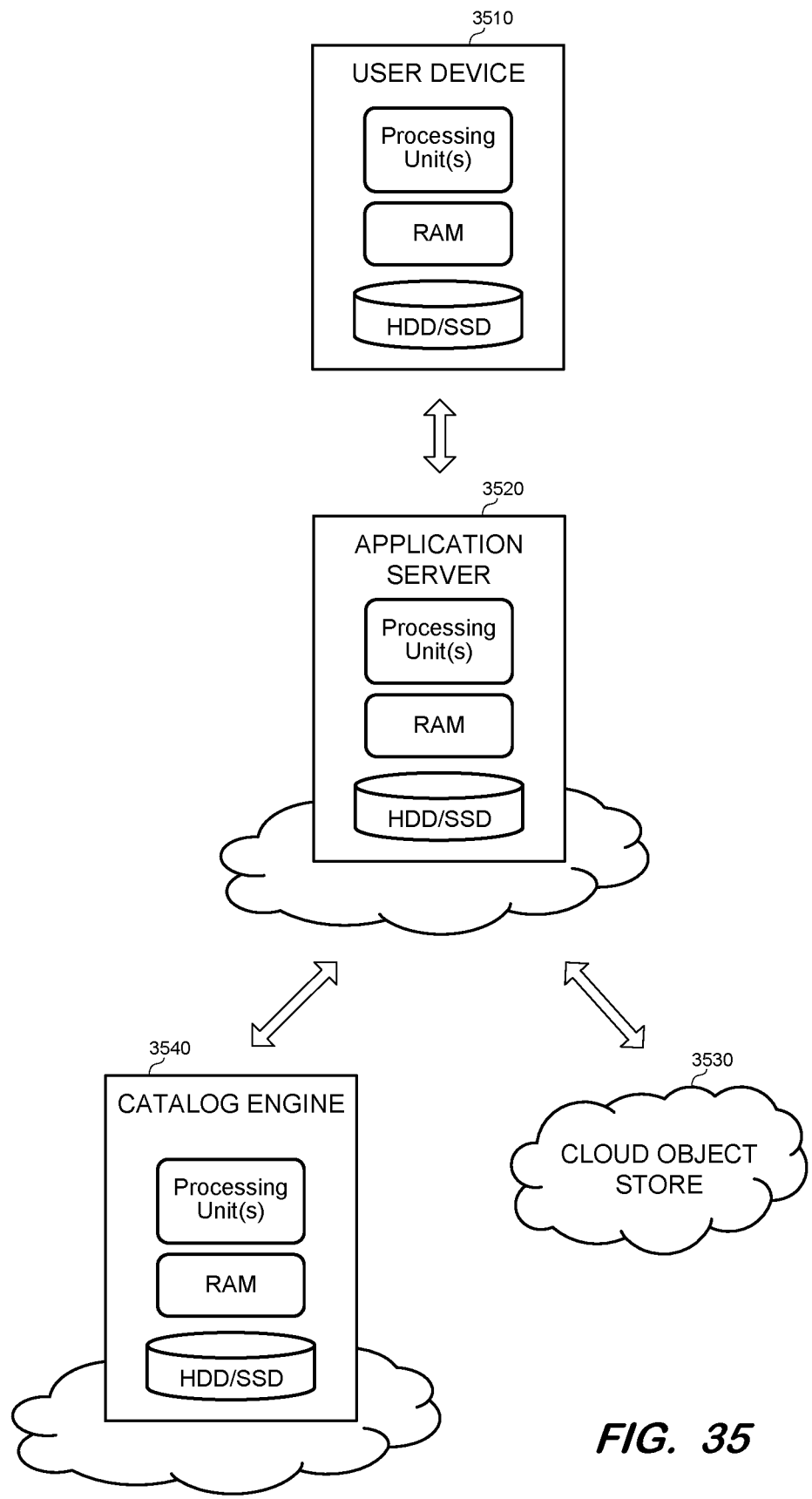
FIG. 35 is a view of a cloud-based database architecture according to some embodiments.

FIG. 35 is a view of a cloud-based database architecture according to some embodiments. The illustrated components may reside in one or more public clouds providing self-service and immediate provisioning, autoscaling, security, compliance, and identity management feature. Application server 3520 and/or catalog engine 3540 may comprise cloud-based compute resources, such as a virtual machines, allocated by a public cloud provider. Cloud object store 3530 may comprise a key-value object store.

User device 3510 may interact with applications executing on application server 3520, for example via a Web Browser executing on user device 3510, in order to create, read, update, and delete data stored in cloud object store 3530. For example, user device 3510 may be operated to instruct an OTF client executing on application server 3520 to upload columnar files of tabular data to cloud object store 3530. Application server 3520 may also communicate with catalog engine 3540 to access a database catalog defining a schema over the tables of the files within cloud object store 3530.

The database catalog may be stored in catalog engine 3540 and may comprise a sequence of transactions appended to a log, each of which includes sets of catalog updates, a snapshot timestamp, and a signature. Application server 3520 may generate sets of catalog updates based on a snapshot of the database catalog provided by catalog engine 3540 and transmit a request to commit a transaction including the updates to catalog engine 3540. Catalog engine 3540 determines whether the updates conflict with any transactions which were committed to the log since a timestamp of the provided snapshot and, if not, commits the transaction to the log.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation described herein may include a programmable processor to execute program code such that the computing device operates as described herein.

All systems and processes discussed herein may be embodied in executable program code stored on one or more non-transitory computer-readable media. Such media may include, for example, a hard disk drive, a DVD-ROM, a Flash drive, magnetic tape, and solid-state Random Access Memory or Read Only Memory storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
a storage system storing a log comprising a set of successive committed transactions on a database catalog, where each of the transactions comprises at least one deletion from or insertion into the database catalog, the database catalog defining a schema of database tables over columnar files stored in an object store; and
at least one processing unit to:
receive first changes to the database catalog;
in response to the received first changes, calculate a snapshot of the database catalog from the set of successive committed transactions and determine a timestamp of the snapshot;
determine, based on the snapshot and the first changes, updates to the snapshot;
receive a first transaction including the updates to the snapshot and the timestamp of the snapshot;
in response to the received first transaction, identify a transaction committed to the log after the timestamp of the snapshot;
determine a signature of the identified transaction committed to the log after the timestamp of the snapshot;
replace each literal component of each of the updates included in the first transaction with a common placeholder to generate modified updates;
determine a representation of each of the modified updates;
determine that a representation of one of the modified updates is a member of a set represented by the signature
in response to the determination that the representation of the one of the modified updates is a member of a set represented by the signature, determine that a non-literal component of the one of the updates is identical to a non-literal component of the identified transaction; and
in response to the determination that the non-literal component of the one of the updates is identical to the non-literal component of the identified transaction, reject the first transaction.

2. The system according to claim 1, the at least one processing unit to:
receive second changes to the database catalog;
in response to the received second changes, calculate a second snapshot of the database catalog from the set of successive committed transactions and determine a second timestamp of the second snapshot;
determine, based on the second snapshot and the second changes, second updates to the second snapshot;
receive a second transaction including the second updates to the second snapshot and the second timestamp of the second snapshot;
in response to the received second transaction, identify a second transaction committed to the log after the second timestamp of the second snapshot;
determine a second signature of the second identified transaction committed to the log after the timestamp of the second snapshot;
replace each literal component of each of the second updates included in the second transaction with the common placeholder to generate modified second updates;
determine a second representation of each of the modified second updates;
determine that none of the second representations is a member of a set represented by the second signature; and
in response to the determination that none of the second representations is a member of a set represented by the second signature, append the second transaction to the log.

3. The system according to claim 2, wherein appending of the second transaction to the log comprises:
determination of a third signature of the second transaction based on the second updates; and
appending of the second transaction and the third signature to the log.

4. The system according to claim 3, wherein the signatures are Bloom filters,
wherein
the representation of each of the modified updates is determined using a hash function,
wherein determination that the representation of the one of the modified updates is a member of a set represented by the signature comprises determination that the representation of the one of the modified updates is a member of a set represented by the Bloom filters,
wherein the third signature is a second Bloom filter,
wherein
the representation of each of the modified second updates is determined using the hash function; and
wherein determination of the third signature of the second transaction comprises addition of each representations of the modified second updates to the second Bloom filter.

5. The system according to claim 1, wherein the database catalog comprises a first one or more Resource Description Framework triples and the updates comprise a second one or more Resource Description Framework triples.

6. The system according to claim 1, wherein the signatures are Bloom filters,
wherein the representation of each of the modified updates is determined using a hash function, and
wherein determination that the representation of the one of the modified updates is a member of a set represented by the signature comprises determination that the representation of the one of the modified updates is a member of a set represented by the Bloom filters.

7. The system according to claim 1, the at least one processing unit to:
lock the log prior to identification of the transaction committed to the log after the timestamp of the snapshot; and
unlock the log after determination, based on the signatures, that the representation of one of the modified updates is a member of a set represented by the signature.

8. A method comprising:
storing a log comprising a set of successive committed transactions on a database catalog, where each of the transactions comprises at least one deletion from or insertion into the database catalog, the database catalog defining a schema of database tables over columnar files stored in an object store;
receiving first changes to the database catalog;
in response to the received first changes, calculating a snapshot of the database catalog from the set of successive committed transactions and determining a timestamp of the snapshot;
determining, based on the snapshot and the first changes, updates to the snapshot;

receiving a first transaction including the updates to the snapshot and the timestamp of the snapshot;
in response to the received first transaction, identifying a transaction stored to the log after the timestamp of the snapshot;
determining a signature of the identified transaction stored to the log after the timestamp of the snapshot;
replacing each literal component of each of the updates included in the first transaction with a common placeholder to generate modified updates;
determining a representation of each of the modified updates;
determining that a representation of one of the modified updates is a member of a set represented by the signature;
in response to the determination that the representation of one of the modified updates is a member of a set represented by the signature, determining that a non-literal component of the one of the updates is identical to a non-literal component of the identified transaction; and
in response to the determination that the non-literal component of the one of the updates is identical to the non-literal component of the identified transaction, rejecting the first transaction.

9. The method according to claim 8, the method comprising:
receiving second changes to the database catalog;
in response to the received second changes, calculating a second snapshot of the database catalog from the set of successive committed transactions and determining a second timestamp of the second snapshot;
determining, based on the second snapshot and the second changes, second updates to the second snapshot;
receiving a second transaction including the second updates to the second snapshot and the second timestamp of the second snapshot;
in response to the received second transaction, identifying a second transaction committed to the log after the second timestamp of the second snapshot;
determining a second signature of the second identified transaction stored to the log after the timestamp of the second snapshot;
replacing each literal component of each of the second updates included in the second transaction with the common placeholder to generate modified second updates;
determining a second representation of each of the modified second updates;
determining that none of the second representations is a member of a set represented by the second signature; and
in response to determining that none of the second representations is a member of a set represented by the second signature, appending the second transaction to the log.

10. The method according to claim 9, wherein appending of second transaction to the log comprises:
determining a third signature of the second transaction based on the second updates; and
appending the second transaction and the third signature to the log.

11. The method according to claim 10, wherein the signature is a Bloom filter, and
wherein determination of the third signature of the second transaction comprises:
determination of a representation of each of the modified second updates to the second snapshot using a hash function; and
adding each of the representations of the second updates to the Bloom filter.

12. The method according to claim 8, wherein the plurality of facts, the facts to be deleted, and the facts to be inserted are Resource Description Framework triples.

13. The method according to claim 8, wherein
the representation of each of the modified updates to the snapshot is determined using a hash function.

14. The method according to claim 8, the method further comprising:
locking the log prior to identification of the transaction stored to the log after the timestamp of the snapshot; and
unlocking the log after determining that the representation of one of the modified updates is a member of a set represented by the signature.

15. A non-transitory computer-readable medium storing program code executable by at least one processing unit of a computing system to:
store a log comprising a set of successive committed transactions on a database catalog, where each of the transactions comprises at least one deletion from or insertion into the database catalog, the database catalog defining a schema of database tables over columnar files stored in an object store;
receive first changes to the database catalog;
in response to the received first changes, calculate a snapshot of the database catalog from the set of successive committed transactions and determine a timestamp of the snapshot;
determine, based on the snapshot and the first changes, updates to the snapshot;
receive a first transaction including the updates to the snapshot and the timestamp of the snapshot;
in response to the received first transaction, identify a transaction stored on the log after the timestamp of the snapshot;
determine a signature of the identified transaction stored on the log after the timestamp of the snapshot;
replace each literal component of each of the updates included in the first transaction with a common placeholder to generate modified updates;
determine a representation of each of the modified updates;
determine that a representation of one of the modified updates is a member of a set represented by the signature;
in response to the determination that the representation of the one of the modified updates is a member of a set represented by the signature, determine that a non-literal component of the one of the updates is identical to a non-literal component of the identified transaction; and
in response to the determination that the non-literal component of the one of the updates is identical to the non-literal component of the identified transaction, reject the first transaction.

16. The computer-readable medium according to claim 15, the program code executable by at least one processing unit of a computing system to:
receive second changes to the database catalog;
in response to the received second changes, calculate a second snapshot of the database catalog from the set of successive committed transactions and determine a second timestamp of the second snapshot;

determine, based on the second snapshot and the second changes, second updates to the second snapshot;

receive a second transaction including the second updates to the second snapshot and the second timestamp of the second snapshot;

in response to the received second transaction, identify a second transaction committed to the log after the second timestamp of the second snapshot;

determine a second signature of the second identified transaction committed to the log after the timestamp of the second snapshot;

replace each literal component of each of the second updates included in the second transaction with the common placeholder to generate modified second updates;

determine a second representation of each of the modified second updates;

determine that none of the second representations is a member of a set represented by the second signature; and in response to the determination that none of the second representations is a member of a set represented by the second signature, append the second transaction to the log.

17. The computer-readable medium according to claim 16, wherein appending of the second transaction to the log comprises:

determination of a third signature of the second transaction based on the second updates; and appending of the second transaction and the third signature to the log.

18. The computer-readable medium according to claim 17, wherein the signatures are a Bloom filters, wherein the representation of each of the modified updates is determined using a hash function, wherein determination that the representation of the one of the modified updates is a member of a set represented by the signature comprises determination that the determined representation of the one of the modified updates is a member of a set represented by the Bloom filters, wherein the third signature is a second Bloom filter, and wherein the representation of each of the modified second updates is determined using the hash function; and wherein determination of the third signature of the second transaction comprises addition of each representations of the modified second updates to the second Bloom filter.

19. The computer-readable medium according to claim 15, wherein the signatures are Bloom filters and wherein the representation of each of the modified updates is determined using a hash function; and wherein determination that the representation of the one of the modified updates is a member of a set represented by the signature comprises determination that the representation of the one of the modified updates is a member of a set represented by the Bloom filters.

20. The computer-readable medium according to claim 15, the program code executable by at least one processing unit of a computing system to:

lock the log prior to identification of the transaction committed to the log after the timestamp of the snapshot; and unlock the log after determination, based on the signature, that the representation of one of the modified updates is a member of a set represented by the signature.

* * * * *